(12) United States Patent
Appelbaum et al.

(10) Patent No.: US 12,141,925 B2
(45) Date of Patent: Nov. 12, 2024

(54) REAL-TIME DATA SOURCE AND CONFIGURATION IDENTIFICATION FOR GEOSPATIAL COLLABORATION ENVIRONMENTS

(71) Applicant: Immersive Wisdom, Inc., Boca Raton, FL (US)

(72) Inventors: Michael S. Appelbaum, Highland Beach, FL (US); Fred Denver Coulson, III, Parks Hill, KY (US)

(73) Assignee: Immersive Wisdom, Inc., Boca Raton, FL (US)

( * ) Notice: Subject to any disclaimer, the term of this patent is extended or adjusted under 35 U.S.C. 154(b) by 0 days.

(21) Appl. No.: 18/615,948

(22) Filed: Mar. 25, 2024

(65) Prior Publication Data

US 2024/0320922 A1 Sep. 26, 2024

Related U.S. Application Data

(60) Provisional application No. 63/491,844, filed on Mar. 23, 2023.

(51) Int. Cl.
G06T 19/00 (2011.01)
G06N 20/00 (2019.01)

(52) U.S. Cl.
CPC ............ *G06T 19/00* (2013.01); *G06N 20/00* (2019.01); *G06T 2219/024* (2013.01)

(58) Field of Classification Search
None
See application file for complete search history.

(56) References Cited

U.S. PATENT DOCUMENTS

| 2021/0232592 A1* | 7/2021 | Liao .................. G06N 20/00 |
| 2022/0066621 A1* | 3/2022 | Appelbaum ............ H04L 65/80 |
| 2022/0197964 A1* | 6/2022 | Du .................... G06F 16/9535 |

* cited by examiner

*Primary Examiner* — Tapas Mazumder
(74) *Attorney, Agent, or Firm* — Polsinelli LLP

(57) ABSTRACT

Systems and methods are provided for generating, in real-time, recommendations for different data elements for different virtual three-dimensional environments. As users interact with data elements presented within these virtual three-dimensional environments, these interactions and changes are processed using a machine learning algorithm in real-time to provide recommendations for new data elements that can be introduced in these virtual three-dimensional environments. Based on responses to these recommendations, the new data elements can be introduced in these virtual three-dimensional environments. Further, the machine learning algorithm is dynamically updated based on these responses.

21 Claims, 10 Drawing Sheets

REAL-TIME DATA SOURCE AND CONFIGURATION IDENTIFICATION FOR GEOSPATIAL COLLABORATION ENVIRONMENTS

CROSS-REFERENCE TO RELATED APPLICATIONS

The present patent application claims the priority benefit of U.S. Provisional Patent Application No. 63/491,844 filed Mar. 23, 2023, the disclosures of which are incorporated by reference herein.

FIELD

The present disclosure relates generally to systems and methods for generating real-time recommendations for implementing particular data sources and configurations in a virtual three-dimensional environment. More specifically, techniques are provided to deploy a framework to model, in real-time, user behavior and data source utilization within myriad virtual three-dimensional environments to provide real-time recommendations corresponding to data sources and configurations that can be implemented in new and existing virtual three-dimensional environments.

SUMMARY

Disclosed embodiments provide a framework for generating real-time recommendations for introducing or otherwise implementing different data sources and configurations in a virtual three-dimensional environment. According to some embodiments, a computer-implemented method is provided. The computer-implemented method comprises obtaining element changes corresponding to a set of data elements. The element changes correspond to interactions performed by a set of users within a virtual three-dimensional room. Further, the virtual three-dimensional room is implemented using a real time stream processor (RSP). The computer-implemented method further comprises dynamically training a machine learning algorithm to generate recommendations corresponding to different data elements for different virtual three-dimensional rooms. The machine learning algorithm is dynamically trained using user behavior and room utilization data corresponding to other users and to other virtual three-dimensional rooms. The computer-implemented method further comprises processing the element changes in real-time while the element changes are occurring. The element changes are processed using the machine learning algorithm to generate a set of recommendations. Further, the set of recommendations correspond to new data elements for the virtual three-dimensional room. The computer-implemented method further comprises providing the set of recommendations. The computer-implemented method further comprises receiving one or more responses to the set of recommendations. The one or more responses indicate acceptance of the new data elements. The computer-implemented method further comprises providing element data corresponding to the new data elements. When the element data is received, the element data causes devices corresponding to the set of users to display the new data elements within the virtual three-dimensional room. The computer-implemented method further comprises dynamically updating the machine learning algorithm using the set of recommendations and the one or more responses.

In some embodiments, the set of users access the virtual three-dimensional room using different types of systems. Further, the different types of systems include virtual reality systems, augmented reality systems, and desktop systems.

In some embodiments, the one or more responses indicate the acceptance of the new data elements as a result of the one or more responses corresponding to a quorum of the set of users having accepted the set of recommendations.

In some embodiments, providing the set of recommendations includes propagating in real-time the set of recommendations to the devices corresponding to the set of users. When the set of recommendations are propagated to the devices, the set of recommendations is displayed in real-time through the virtual three-dimensional room.

In some embodiments, the virtual three-dimensional room is implemented using a hierarchical component-based model-view-viewmodel (MVVM) decentralized application.

In some embodiments, the user behavior and room utilization data include user data corresponding to roles associated with the other users.

In some embodiments, the element data corresponding to the new data elements is provided according to a set of permissions associated with the new data elements and the set of users.

In an embodiment, a system comprises one or more processors and memory including instructions that, as a result of being executed by the one or more processors, cause the system to perform the processes described herein. In another embodiment, a non-transitory computer-readable storage medium stores thereon executable instructions that, as a result of being executed by one or more processors of a computer system, cause the computer system to perform the processes described herein.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms.

The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

BRIEF DESCRIPTION OF THE DRAWINGS

The present disclosure is described in conjunction with the appended Figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing preferred examples of embodiments. It is understood that various changes can be made in the function and arrangement of elements without departing from the spirit and scope as set forth in the appended claims.

Figure 1:
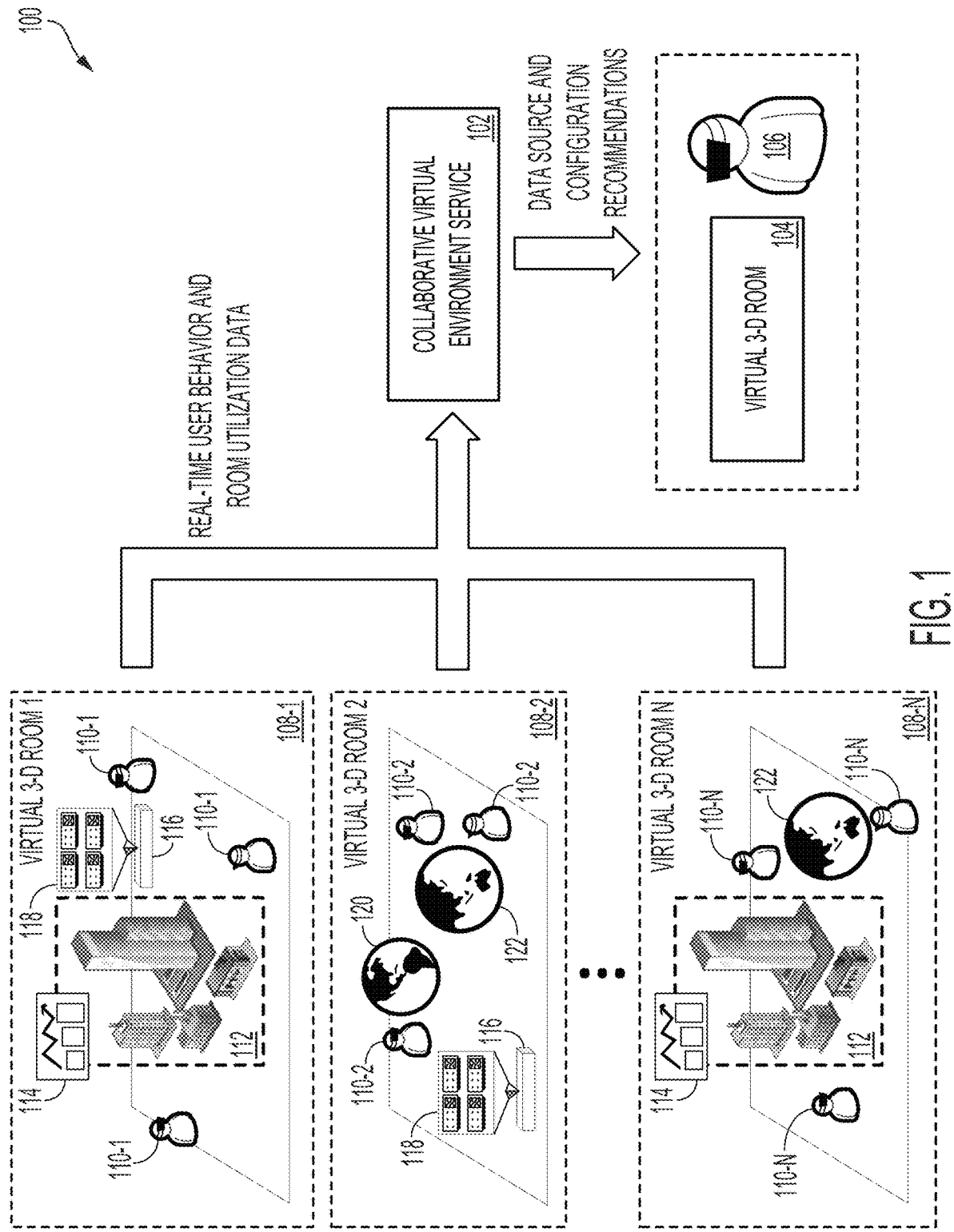
FIG. 1 shows an illustrative example of an environment in which a collaborative virtual environment service automatically and in real-time processes real-time user behaviors and data source utilization data from active virtual three-dimensional rooms to generate data source and room configuration recommendations in accordance with at least one embodiment.

FIG. 1 shows an illustrative example of an environment 100 in which a collaborative virtual environment service 102 automatically and in real-time processes real-time user behaviors and data source utilization data from active virtual three-dimensional rooms 108-1-108-N to generate data source and room configuration recommendations in accordance with at least one embodiment. In the environment 100, the collaborative virtual environment service 102 may provide users with geospatially-aware environments that allow these users to visualize multi-domain spaces through which users may interact with various elements simultaneously in real-time. For example, within a virtual three-dimensional room, users may simultaneously interact with and analyze sensor feeds, network data, collection platforms, existing web/desktop applications, telemetry, tagged assets, imagery, aerial footage/streaming video, and the like. The collaborative virtual environment service 102 may also provide an interface to multi-dimensional data sets generated using machine learning techniques and/or artificial intelligence systems.

In an embodiment, the collaborative virtual environment service 102 implements a hierarchical component-based model-view-viewmodel (MVVM) decentralized application that represents and abstracts the code usable to create virtual and augmented reality applications that are shared across various users. This may allow software developers to create applications in a domain space where these developers may not have technical knowledge to perform in. Further, this may handle the communication and data synchronization across numerous users without plugin developers needing to implement networking code. The view and viewmodel of the MVVM may be made up of interactable elements and may be implemented in the client. The model may be made up of interactable elements that are implemented in the library that is used by the client and plugin.

The viewmodel and model may be built of individual components that can be reinstrumented across numerous domains. These components may attach to core objects of the collaborative virtual environment service and allows for the construction of individual components, unaware of one another, into a larger piece.

The collaborative virtual environment service client may handle the view and viewmodel portions of the MVVM framework utilizing interactable elements. This client may handle rendering, user interaction, and mathematical operations required for proper visual layout of data. The view of the MVVM utilizes Unity's feature set as well as custom rendering layers to help in the display of the model. The view may be unaware of any of the model. The viewmodel may handle listening to model state changes and appropriately drives the properties read by the view.

The viewmodel objects of the client may be composed of interactable elements. These objects may be layers binding a backing interactable element from the model to the attached interactable components on the item. Interactable components may be dynamic components that handle ingesting specific model changes to update the view and also write back to the model based on user interaction. For instance, an interactable market (the representation of a geolocated object residing on a projected map 112) may comprise a geolocation component, a color component, a size component, a heading component, and various other components that comprise the final object. These components may be re-used within the environment. This same geolocation component may reside on the map 112, overlay, etc. The color component may be re-used across markers, models, drawings, graphs, a user's heads-up display (HUD), and the like. These components may be automatically constructed. For instance, by looking at the property and interfaces composing a model object from the library, it can be broken apart based on the properties it includes and automatically bind interactable components needed to display and interact with it.

The library of the collaborative virtual environment service 102 may compose the model of the MVVM structure with the component being the interactable element. The interactable element is hierarchical in structure. For instance, the interactable element may hold, at its root, a room element corresponding to a particular virtual three-dimensional room. This room element may include collections of user elements and container elements. A container element may serve as the core data binding for internal and external data that is represented in the particular virtual three-dimensional room. As an illustrative example, for virtual three-dimensional room 108-1, the map 112, the graph 114, the panel 116 and corresponding data elements 118, browsers, desktops, and additional containers may be found rooted in this hierarchy.

Interactable elements may only hold data and notify the correct recipients to changes in that data. A user may utilize classical listeners for data changes or an element component. The element component may comprise logical operations and changes that a user wants to be executed based on element changes or updates from external sources. The element component may have automatic databinding attributes that are thread safe and aggregated making use of a property changed system provided by the collaborative virtual environment service. These components may allow for an extension of functionality in a generic fashion and may serve as the core to providing logic outside of the client, such as in plugins, server-sided functionality, and customized feature sets that can run permanently, whether in the virtual three-dimensional room 104 that is acting on the interactable element data or not.

The collaborative virtual environment service 102, in an embodiment, provides a plugin system that serves as one component of the model. This system may drive software developers to focus primarily on their data and displaying it to end users. Using various event-driven techniques, plugin developers can respond to interactions a user makes, add new data to the user's space, and respond to changes to that same interactable element data. For example, if the user corresponding to an avatar 110-1, clicks on the panel 116, a plugin may present the user with an element 118 that includes a video feed of various features from an external source. As the user, through an avatar 110-1, interacts with this video feed, the plugin may respond to these interactions and update the panel 116 and corresponding element 118 in real-time. Further, these changes may be propagated to the other users that may be presented within the virtual three-dimensional room 108-1. The data presented may also be allowed to be driven by multiple plugins simultaneously that are loaded by end users.

Plugins may be written using classical programming languages or utilize the element component provided by the collaborative virtual environment service. By using the element component, plugins can permanently attach code to interactable elements that run at regularly scheduled intervals or based on changes to that underlying data. This may allow plugins to extend beyond the confines of a virtual three-dimensional room and focus on the data itself and how the data is mutated. Plugin developers may connect and drive the data that is processed via the collaborative virtual environment service 102.

The databinding that may occur across the aforementioned components may be driven by a number of libraries and interfaces. The core of any collaborative virtual environment service instance may be the virtual three-dimensional room, which may be driven by a server maintained by the collaborative virtual environment service 102. This server may connect multiple users (such as users within any of virtual three-dimensional rooms 108-1-108-N) together to be available within the same space. When users join the space, these users may begin communication of their device's information so that all users can see and express the same data simultaneously. As an illustrative example, if a user, via an avatar 110-1 within virtual three-dimensional room 108-1, interacts with a marker of the map 112, resulting in the presentation of graph 114 within the virtual three-dimensional room 108-1, the interaction and presentation of the graph 114 may be presented to the other users within the virtual three-dimensional room 108-1 simultaneously and in real-time via their representation of the virtual three-dimensional room 108-1.

On the client side, an application programming interface (API) may be provided that runs on a separate thread processing user interaction and forwards that information to the collaborative virtual environment service server. This same process may receive information from the server, which is then processed and displayed by the client to the corresponding user.

In an embodiment, users can boot up plugins that process data. These plugins may be driven remotely and operate as end users. The server may boot up a containerized application and run the plugin. The plugin may be fed with all information about the current state of the virtual three-dimensional room that an end user is attempting to join or create so that the plugin may begin responding and adding its own information to the space. This may allow for decentralization of CPU usage of all applications. For instance, a resource-intensive plugin may be executed on its own computer and feed the necessary data to the collaborative virtual environment service as needed. This may be done across numerous instances such that clients, other plugins, and the server do not monopolize resources from each other.

In an embodiment, the collaborative virtual environment service client supports loading custom-made plugins to provide additional functionality within a virtual three-dimensional room. For instance, plugin developers may utilize the element library of the collaborative virtual environment service 102 to develop these plugins. Plugins may be loaded from a directory on a user's device, as specified in a configuration file, and are available for the user to activate via an in-application menu. Plugins may have no restrictions on the element data they can access and modify.

The aforementioned element library may provide various features, such as user interaction events, to which plugins can listen and take action. These features may be divided into property changes, collection changes, and user interaction events. Local plugins may function in both online and offline virtual three-dimensional rooms, while server plugins may only work in online virtual three-dimensional rooms.

Whenever a property of an element changes, whether by a local user, local plugin, or remote user, the element may fire an event with the name of the property that was changed. A property may be a simple feature of an element, such as a color on a marker element. Plugins may be able to attach to this event and run any custom code as desired. Property changes may be networked, such that a local plugin can execute code in response to a user interaction from anyone in a virtual three-dimensional room. For example, if a user within virtual three-dimensional room 108-1 interacts with the panel 116 and modifies a data element 118 associated with the panel 116, a property associated with the data element 118 may be changed, which may result in the data element 118 firing an event with the name of the property associated with this data element 118 that was changed. Any plugin implemented within virtual three-dimensional room 108-1 may attach to this particular event and run any custom code that is keyed off of the modification of data element 118.

Particular elements may further include collections of other elements. For instance, as illustrated in FIG. 1, a map element 112 presented in virtual three-dimensional rooms 108-1 and 108-N may include a marker element that may be connected to a graph element 114 that may be presented as a result of user interaction with the marker element. Whenever items are added, removed, or reordered in a collection, the collection may fire an event detailing what changes were made to the collection. For instance, if a user within virtual three-dimensional room 108-1 adds data to a marker element of the map element 112, the collection may fire an event detailing this addition of data to the marker element and the corresponding map element 112. Collection changes may be networked such that a local plugin can execute code in response to a collection change caused by a remote user or plugin.

In an embodiment, user interactions with elements within a virtual three-dimensional room will fire events based on the interaction. For instance, if a user clicks on a marker element within the map element 112, this may result in an event being fired that results in the presentation of the graph element 114. This may provide plugins the ability to execute code when a user interacts with certain data. Certain elements may have click events while others may have hover events. Events may be networked and the session identifier of the user who caused the event is included. This may allow a local plugin to execute code to respond to user interaction from anyone in the virtual three-dimensional room.

The collaborative virtual environment service server may serve as an intermediary to all data and may be represented through one or more servers. A master server may connect users so that they may find out what virtual three-dimensional rooms are available to join. These rooms can be private, public, locked, or joinable. A user can also create a new room to join and make the virtual three-dimensional room to others. When a virtual three-dimensional room is created, message broker streams are generated for queueing up and down the data.

The collaborative virtual environment service 102, in an embodiment, implements a real time stream processor (RSP) that is used to connect clients together as well as plugins that are booted up and running. Clients may be operating on standalone devices and may not reside on the RSP. Plugins, however, may optionally be loaded on the same device or botted on a separate device based on its configuration. Plugins may be containerized such that unreliable or malicious plugins cannot monopolize resources or perform dangerous operations.

Server plugins may be supported by running plugins directly on the RSP in an online virtual three-dimensional room. Server plugins may perform similar operations to those of local plugins described above. These server plugins may perform complex calculations without affecting the framerate of a user's application and may be available in the virtual three-dimensional room regardless of who connects and disconnects from the virtual three-dimensional room.

Plugins and clients, whether local or remote, may perform through network communication with the collaborative virtual environment service server. This communication is performed through token-based, compressed and encrypted JavaScript Object Notation (JSON) data that the RSP processes. The RSP may ingest this data into numerous message broker clusters that relay out to other users and plugins, as well as store the data to speed up the immediacy of when new uses join a virtual three-dimensional room. It should be noted that while JSON data is used extensively throughout the present disclosure for the purpose of illustration, other parsable formats may be used.

The data written by the RSP into the message broker may be permanently stored for historical storage of the virtual three-dimensional room 104. This may allow end users to audit old room states and playback the state of the virtual three-dimensional room 104 to ascertain the data viewed, modified, and interacted with. The RSP may further determine when a plugin or user is allowed to view or manipulate data. This may be dependent on the security level of a user or the permissions given to a plugin.

In addition to the RSP, the collaborative virtual environment service 102 may implement a filter server. The filter server may provide users with the ability to create and join rooms, forwarding messages reliably and unreliably to other users in a virtual three-dimensional room, allowing reconnection, and verifying JSON web tokens (JWTs) or other cryptographic tokens upon connection.

In an embodiment, the collaborative virtual environment service 102 monitors, in real-time, user behaviors (including interactions with any elements and data sources), active virtual three-dimensional room configurations, and corresponding virtual three-dimensional room utilization to automatically identify any trends that may be used to recommend data sources and virtual three-dimensional room configurations to other users associated with the collaborative virtual environment service 102. As an illustrative example, as users within virtual three-dimensional room 108-1 (such as through avatars 110-1) interact with the various data elements and corresponding data sources within the virtual three-dimensional room 108-1 (e.g., map 112, the graph 114, the panel 116 and corresponding data elements 118, etc.), the collaborative virtual environment service 102 may automatically, and in real-time, detect any events generated as a result of user interactions with elements within the virtual three-dimensional room 108-1. As noted above, events may be networked and the session identifier of the user who caused the event is included. Thus, events may be used to determine, in real-time, element utilization within the virtual three-dimensional room 108-1, as well as user behavior as events corresponding to a particular user (as determined through a session identifier corresponding to the user) are detected. Additionally, the collaborative virtual environment service 102 may, in real-time, monitor the activities of the filter server as users create and join rooms, forwards messages reliably and unreliably to other users in virtual three-dimensional rooms, reconnects users to existing virtual three-dimensional rooms, and verifies JWTs or other cryptographic tokens upon connection.

In an embodiment, the collaborative virtual environment service 102 implements a machine learning algorithm or artificial intelligence that is dynamically trained in real-time to process aggregated data corresponding to user interactions with elements in different virtual three-dimensional rooms and to configurations of these virtual three-dimensional rooms to generate recommendations for data sources and other elements that may be implemented or otherwise introduced to a new or existing virtual three-dimensional room. The machine learning algorithm or artificial intelligence may be dynamically trained using supervised training techniques. For instance, a dataset of virtual three-dimensional room configurations for a sample set of virtual three-dimensional rooms, events associated with users within this sample set of virtual three-dimensional rooms, user characteristics (e.g., demographics, occupation (e.g., law enforcement, military, education, etc.), role (e.g., dispatcher, professor, student, etc.), etc.), and known trends may be selected for training of the machine learning algorithm or artificial intelligence. The known trends used to train the machine learning algorithm or artificial intelligence may include correlations between the types of users and virtual three-dimensional rooms with the types of data elements introduced or interacted with within these virtual three-dimensional rooms. Further, these correlations may correspond to user behaviors resulting from the introduction and/or presence of different data elements within these virtual three-dimensional rooms for different virtual three-dimensional room types.

The machine learning algorithm or artificial intelligence may be evaluated to determine, based on the input sample dataset, whether the machine learning algorithm or artificial intelligence is identifying an accurate set of trends and generating accurate data resource and/or virtual three-dimensional room configuration recommendations based on this set of trends. For example, if the sample dataset corresponds to a set of virtual three-dimensional rooms implemented to provide an educational environment for a set of students and educators, and these students and educators actively interact with a data element corresponding to a mathematical application and associated data, the machine learning algorithm or artificial intelligence may be evaluated to determine whether the machine learning algorithm or artificial intelligence accurately identified the particular data element as being pertinent or desirable for these types of users and virtual three-dimensional rooms (e.g., students/educators and educational environment, respectively). If the machine learning algorithm or artificial intelligence outputs a recommendation corresponding to the introduction of a data element corresponding to a live video feed of a road intersection, an evaluator of the machine learning algorithm or artificial intelligence may determine that the recommendation does not comport with the expected recommendation for such virtual three-dimensional rooms and/or users. Accordingly, the evaluator may re-train the machine learning algorithm or artificial intelligence by adding annotations to the recommendation, indicating the appropriate recommendation that should have been presented based on the sample dataset.

In an embodiment, the machine learning algorithm or artificial intelligence implemented by the collaborative virtual environment service can include one or more natural language processing (NLP) algorithms that may automatically process any communications amongst users within different active virtual three-dimensional rooms (e.g., virtual three-dimensional rooms 108-1-108-N) to determine user behaviors within these virtual three-dimensional rooms. As used herein, NLP is a mechanism whereby computational systems such as those described herein may be used to process and analyze language (from text and audio sources) that is natural (i.e., unstructured). In such systems, the result of the analysis may enable the NLP algorithms to generate insights (i.e., information) about the contents of the source communications and, by extension, about other communications that are in the same language. In such systems, the result of the analysis may enable the NLP algorithms to categorize and/or provide metadata about the source communications and/or about other communications. Being able to both understand and categorize natural language enables a system implemented by the collaborative virtual environment service 102 to generate better and/or more accurate insights from natural language and may provide a basis for a system that can receive natural language, understand it, and respond in a reasonable manner. As the NLP algorithms process and analyze a larger set of natural language sources (e.g., communications sessions and corresponding communications, etc.), the quality of the understanding and interaction may improve. Examples of NLP algorithms include, but are not limited to, rule-based NLP (also referred to as "symbolic" NLP and based on sets of applied rules), statistical NLP (generally implemented with unsupervised and/or semi-supervised statistical analyses of unstructured data), and Neural NLP (based on representation learning and deep-learning artificial intelligence techniques). As may be contemplated, when analyzing text sources for NLP, systems can directly input the text into the analysis system while analyzing audio sources may involve first performing speech recognition on the audio source to extract the words and then those words can be input into the analysis system.

In an embodiment, the machine learning algorithm or artificial intelligence may be further dynamically trained using unsupervised training techniques. For instance, the aforementioned dataset may be analyzed using a clustering algorithm to identify different data elements and sources that may be closely correlated to particular types of users and/or virtual three-dimensional rooms (e.g., clusters). In some embodiments, the sample dataset can be analyzed to identify correlations between different types of users and their behaviors, the different types of virtual three-dimensional rooms, and the types of data elements or sources included therein. Example clustering algorithms that may be trained using training data can include k-means clustering algorithms, fuzzy c-means (FCM) algorithms, expectation-maximization (EM) algorithms, hierarchical clustering algorithms, density-based spatial clustering of applications with noise (DBSCAN) algorithms, and the like. Based on the output of the machine learning algorithm or artificial intelligence, the collaborative virtual environment service 102 may provide recommendations to users regarding data sources/elements that may be introduced into their virtual three-dimensional rooms and configurations for their virtual three-dimensional rooms.

In an embodiment, to dynamically train the machine learning algorithm or artificial intelligence to generate recommendations for data sources and other elements that may be implemented or otherwise introduced to new or existing virtual three-dimensional rooms, the collaborative virtual environment service 102 may generate an initial iteration of the machine learning algorithm or artificial intelligence. For instance, the collaborative virtual environment service 102 may initialize a set of coefficients randomly according to a normal probability distribution for the machine learning algorithm or artificial intelligence. Using this initial iteration of the machine learning algorithm or artificial intelligence, the collaborative virtual environment service 102 may process the training dataset to generate an output. This output may specify, for instance, different sets of trends and corresponding data resources and/or virtual three-dimensional room configuration recommendations based on these different sets of trends. The collaborative virtual environment service 102 may compare the output generated using the initial iteration of the machine learning algorithm or artificial intelligence to the sample trends (e.g., known trends) defined in the dataset for each of the data points (e.g., set of virtual three-dimensional rooms, events associated with users within this sample set of virtual three-dimensional rooms, and user characteristics of these users) to identify any inaccuracies or other errors.

If the output of the machine learning algorithm or artificial intelligence does not satisfy one or more pre-defined criteria implemented by the collaborative virtual environment service 102, the collaborative virtual environment service 102 may iteratively update one or more coefficients of the set of coefficients to dynamically generate an updated machine learning algorithm or artificial intelligence. This updated machine learning algorithm or artificial intelligence may be used to process the aforementioned dataset, as well as any additional data points or datasets obtained by the collaborative virtual environment service 102 (such as through evaluation of any newly generated virtual three-dimensional rooms and identification of any new trends, etc.), to generate a new output. In some instances, the collaborative virtual environment service 102 may use an optimization algorithm to iteratively update one or more coefficients of the set of coefficients. For instance, the collaborative virtual environment service 102 may use gradient descent to update the logistic coefficients of the machine learning algorithm or artificial intelligence to enable generation of new cutoff values that may be used to classify the data points of the previously evaluated dataset and of any new data points obtained by the collaborative virtual environment service 102. The collaborative virtual environment service 102 may use this updated machine learning algorithm or artificial intelligence to process the available data points and generate a new output. The collaborative virtual environment service 102 may evaluate this new output to determine whether the output satisfies the one or more criteria. This process of updating the set of coefficients associated with the machine learning algorithm or artificial intelligence according to the one or more criteria may be performed iteratively until an updated machine learning algorithm or artificial intelligence is produced that satisfies the one or more criteria.

In the illustrative example provided in FIG. 1, if user 106 submits a request to the collaborative virtual environment service 102 to create a new virtual three-dimensional room 104, the collaborative virtual environment service 102 may identify one or more user characteristics associated with the user 106. For instance, when the user 106 submits their credentials to the collaborative virtual environment service 102, the collaborative virtual environment service 102 may access a user account associated with the user 106 to determine whether the provided credentials are valid and, if so, return a JWT or other cryptographic token to the user 106. User accounts with the collaborative virtual environment service 102 may be registered and administered via a web portal, which may be accessed via a collaborative virtual environment website connection, as described in greater detail herein. In an embodiment, in addition to authenticating the user 106 through evaluation of any supplied credentials, the collaborative virtual environment service 102 may evaluate the user account associated with the user 106 to identify any roles assigned to the user 106. For instance, the collaborative virtual environment service 102 may allow organizations to define their own custom roles for a deployment of a virtual three-dimensional environment that matches their internal organizational structure. A particular role may be associated with a group of users, as defined by an organization, such that by sharing to a particular role, elements can be shared to the group of users that have the matching role in their user account. Roles may be inheritable structures allowing organizations to define roles within roles. For instance, if a user 106 is assigned a role that is a subset of the defined role on an interactable element, the user 106 will be granted access to the interactable element.

In addition to identifying any roles associated with the user 106, the collaborative virtual environment service 102 may evaluate the user account associated with the user 106 to identify any other user characteristics that may be used to determine what data elements, data sources, and room configurations may be recommended to the user 106 in response to their request. For instance, the user account may specify any known user demographics (e.g., age, race, marital status, income, etc.). Additionally, or alternatively, the user account associated with the user 106 may indicate the user's known geographic location. This known geographic location may be provided by the user 106 during an account registration process, through geolocation (e.g., Internet Protocol (IP)-based geolocation, Global Positioning System (GPS)-based geolocation, etc.), or as defined by an organization or other entity that created the user account. In addition to identifying the user's demographics and location from their user account, the collaborative virtual environment service 102 may identify, from the user account, the user's current occupation (e.g., law enforcement, military, education, etc.).

In some instances, in response to the request to create a new virtual three-dimensional room 104, the collaborative virtual environment service 102 may prompt the user 106 to provide additional information regarding the purpose of the new virtual three-dimensional room 104. For example, when the user 106 submits their request to create a new virtual three-dimensional room 104, the collaborative virtual environment service 102 may prompt the user 106 to indicate what the purpose of the new virtual three-dimensional room 104 will be. As an illustrative example, if the user 106 indicates that the virtual three-dimensional room 104 will be used for educational purposes, the collaborative virtual environment service 102 may use this information (as described in greater detail herein) to recommend different data elements and room configurations that are tailored for an educational environment. As another illustrative example, if the user 106 indicates that the virtual three-dimensional room 104 will be used to assist in a criminal investigation at a particular location, the collaborative virtual environment service 102 may use this information to recommend different data elements and room configurations that are conducive to data gathering for such investigations and that may be specific to the criminal investigation the user 106 is a part of (subject to any applicable permissions or other forms of vetting, as described in further detail herein).

In an embodiment, the collaborative virtual environment service 102 uses the obtained user characteristics associated with the user 106 and/or responses provided by the user 106 to the prompts submitted by the collaborative virtual environment service 102 as input to the aforementioned machine learning algorithm or artificial intelligence. The machine learning algorithm or artificial intelligence may process, in real-time, these obtained user characteristics and/or responses to generate a set of data source and room configuration recommendations that may be provided to the user 106. For example, if the user 106 is a dispatcher associated with an emergency services team at a particular location, the collaborative virtual environment service 102, through the machine learning algorithm or artificial intelligence, may identify one or more data sources corresponding to the particular location and that may be relevant to the user's role as a dispatcher at the particular location. Further, the collaborative virtual environment service 102, through the machine learning algorithm or artificial intelligence, may recommend a particular virtual three-dimensional room configuration that may be conducive to the user 106 in performing their role as a dispatcher for the emergency services team at the particular location. For instance, if other members of the emergency services team maintain different virtual three-dimensional rooms for managing pertinent emergencies (e.g., coordinating different law enforcement and rescue teams, sharing live video feeds at the particular location, providing one or more communications pathways for different emergency services entities to communicate, etc.), the machine learning algorithm or artificial intelligence may provide a recommendation corresponding to one or more of the different data sources and elements implemented in these different virtual three-dimensional rooms, as well as any room configurations that may be best suited for the user's role as a dispatcher associated with the emergency services team.

In an embodiment, the collaborative virtual environment service 102 implements one or more foundation models that are dynamically trained in real-time to automatically generate a new virtual three-dimensional room that may be configured according to a natural-language request submitted by the user 106. A foundation model is a large machine learning model or artificial intelligence model that is dynamically trained using a large or broad dataset comprising unlabeled data to automatically perform a wide range of functions. The foundation model may rely on self-supervised learning (SSL) techniques, whereby the dataset used to train the foundation model is unlabeled or unstructured such that the foundation model may automatically generate labels for the data included in the dataset through the identification of complex patterns from the unlabeled dataset. These automatically generated labels may be used by the foundation model in subsequent iterations as ground truths that can be used to further train the foundation model.

The dataset used to dynamically train the foundation model may include virtual three-dimensional room configurations for a sample set of virtual three-dimensional rooms, events and/or actions associated with users within this sample set of virtual three-dimensional rooms, and user characteristics associated with these users. In some instances, the dataset may further include user selections of different data sources for their virtual three-dimensional rooms. The foundation model, in an embodiment, can automatically and in real-time process this dataset to generate different correlations amongst different types of virtual three-dimensional rooms, users, data sources, and configurations. From these correlations, the foundation model may assign labels to these correlations that may be leveraged to automatically process user requests for creation of new virtual-three dimensional rooms. For example, using an NLP algorithm as described above, the collaborative virtual environment service 102, through the foundation model, may process a natural-language request from a user to the collaborative virtual environment service 102 to provision a new virtual three-dimensional room that is likely to satisfy the user's requirements indicated in their request. Through the NLP algorithm, the collaborative virtual environment service 102 may identify one or more keywords or anchors that may be used by the foundation model to automatically generate one or more virtual-three-dimensional room configurations that may be offered to the user 106. Based on any user selections, the foundation model may be automatically re-trained to improve the accuracy of the foundation model in automatically providing options for different virtual three-dimensional rooms according to user requests and/or in automatically instantiating virtual three-dimensional rooms in response to these user requests.

As an illustrative example, a user 106, through an interface provided by the collaborative virtual environment service 102, may submit the following query: "Generate a new operations center to address the security needs at Lumen Field." In response to this query, the foundation model may automatically process this query to identify one or more keywords or anchors associated with this query. For instance, from the user-provided query, the foundation model may automatically identify the anchors "new operations center," "security needs," and "Lumen Field." Based on these anchors, the foundation model may automatically determine that the user 106 has requested creation of a new virtual three-dimensional room that is to be used to monitor different areas of Lumen Field in order to ensure the security of Lumen Field. Further, based on these anchors, the foundation model may automatically identify, from different data sources utilized by the foundation model and used to train the foundation model, any relevant virtual three-dimensional room configurations and corresponding data elements that may be implemented in a new virtual three-dimensional room that may satisfy the needs expressed by the user 106 in their request. For example, the foundation model may automatically identify any data elements corresponding to security camera feeds implemented at Lumen Field that the user 106 may have access to. Further, the foundation model may automatically identify any open source or public data sources that may be used to generate one or more data elements that may be included in the new virtual three-dimensional room. For instance, the foundation model, based on the request to generate a new operations center to address the security needs at Lumen Field, may provide a data element through which the user 106 may be presented with any Seattle Police Department or Seattle Fire Department bulletins or alerts that may be related to security concerns within the vicinity of Lumen Field.

In some instances, the collaborative virtual environment service 102 may allow the user 106 to refine their query in order to dynamically tune the different virtual three-dimensional room options provided by the foundation model in response to the query. Returning to the original query described above (e.g., "Generate a new operations center to address the security needs at Lumen Field"), the user 106 may dynamically revise their query to add or modify any one or more keywords or anchors associated with this query such that the new query "Generate a new operations center to address the security needs at Lumen Field but only where traffic congestion has been above normal and where past security events have been reported" is provided. This revised query may include additional keywords and anchors that may be dynamically detected by the foundation model in real-time. For example, from this revised query, the foundation model may automatically identify the anchors "traffic congestion," "above normal," and "past security events." Further, the foundation model may automatically identify any qualifier keywords that may be used to qualify these identified anchors. For example, from the keyword "only" in the context of the anchors "traffic congestion" and "above normal," the foundation model may automatically determine that the user 106 has requested a virtual three-dimensional room that includes data elements corresponding to locations where traffic congestion has been above normal in the proximity of Lumen Field. Further, through the keyword "and" in the context of the previously identified anchors, the foundation model may automatically determine that the requested virtual three-dimensional room is to further include data elements corresponding to locations where security events have been previously reported.

In an embodiment, as the user 106 refines their query to the collaborative virtual environment service 102, the foundation model automatically, and in real-time, dynamically updates the previously provided three-dimensional room options provided to the user 106 according to these refinements to the query. Returning to the previous illustrative example where the user 106 has revised their query to indicate that the new operations center is to correspond to locations where traffic congestion is above normal and where past security events have occurred, the foundation model may automatically revise any previously provided three-dimensional room options such that these various options include data elements corresponding to locations where traffic congestion has been above normal within proximity of Lumen Field and where past security events associated with Lumen Field have been reported. The foundation model, for instance, may automatically identify, from the different data sources utilized by the foundation model and used to train the foundation model, any newly relevant virtual three-dimensional room configurations and corresponding data elements that may be implemented in a new virtual three-dimensional room that may satisfy the new requirements expressed by the user 106 in their updated query. Additionally, the foundation model may automatically remove any previously provided three-dimensional room options that no longer satisfy the requirements specified by the user 106 in their revised query. Thus, revisions are made to a submitted query, the foundation model may automatically, and in real-time, also revise the provided virtual three-dimensional room configurations and corresponding data elements presented to the user 106.

Turning to the illustrative example illustrated in FIG. 1, the collaborative virtual environment service 102 may implement, on behalf of different users and organizations, myriad different virtual three-dimensional rooms 108-1-108-N, through which users within these different virtual three-dimensional rooms 108-1-108-1-N may interact, dynamically and in real-time, which different data elements and other users. For example, within virtual three-dimensional room 108-1, users 110-1 may actively interact with a map 112, a graph 114, a panel 116, and other data elements 118 corresponding to the panel 116. Each user 110-1 within the virtual three-dimensional room 108-1 may interact with any of the data elements presented within the virtual three-dimensional room 108-1 subject to a set of permissions that may be applicable to each user 110-1.

As another illustrative example, within virtual three-dimensional room 108-2, users 110-2 may actively interact with globes 120-122. Additionally, users 110-2 may interact with the panel 116 and the corresponding data elements 118. The panel 116 and corresponding data elements 118 may be similar to those included in the virtual three-dimensional room 108-1, enabling users within different virtual three-dimensional rooms to interact with the same or similar data elements in real-time. However, access to the panel 116 and the corresponding data elements 118 may be subject to different permissions corresponding to the users 110-2 as opposed to the permissions corresponding to the users 110-1 within the virtual three-dimensional room 108-1. For example, while virtual three-dimensional room 108-1 is associated with a permission whereby users 110-1 (subject to any additional permissions according to user roles, etc.) may have, by default, full access to the panel 116 and corresponding data elements 118, the virtual three-dimensional room 108-2 may be associated with a permission whereby users 110-2 may have, by default, only read access to the panel 116 and corresponding data elements 118. This differentiation in access may be recorded by the collaborative virtual environment service 102 such that the data source and configuration recommendations for the user 106 may be generated according to the frequency of common data elements within different virtual three-dimensional rooms and to the roles and permissions applicable to the user 106, as described in greater detail herein.

Virtual three-dimensional room 108-N may further include map 112, graph 114, and globe 122, which may be accessed by users 110-N subject to any applicable permissions. Similar to the panel 116 and corresponding data elements 118 in both virtual three-dimensional rooms 108-1 and 108-2, the map 112 and graph 114 (in common with virtual three-dimensional room 108-1), and globe 122 (in common with virtual three-dimensional room 108-2) may be subject to different permissions corresponding to the users 110-N as opposed to the permissions corresponding to the users 110-1 and 110-2, respectively. Further, the virtual three-dimensional room 108-N may be subject to different permissions for the data elements in common with virtual three-dimensional rooms 108-1 and 108-2. These different permissions across the different virtual three-dimensional rooms 108-1-108-N, along with the real-time user behavior and room utilization data, may be used to generate the data source and room configuration recommendations for the user 106.

In an embodiment, permissions are a generic structure to define access in accordance with data types. As opposed to specifying roles to group users and plugin access, permissions can be defined. For instance, permissions may be set on particular roles or users. Permissions may be contextually aware of the data itself and can more accurately describe the corresponding restriction. For example, a permission having the string "Contractor" can be defined and assigned to all users that are contractors. As another example, the permission "Foxtrot 2 Demo-8 Mission" could be assigned to the role "Bombers," the role "Foxtrot 2 Demo-12 Team," the role "Complex 7 Staff," and user "GSmith."

Similar to permission-based access, access may be managed using plugin permissions, wherein plugin permissions are explicitly grouped to a particular plugin identifier. This may be used for releasing a plugin across a wide domain of organizations. Rather than being defined by an organization, these permissions may be created by the plugins that are stored on the server. For instance, a plugin called "No_Write_Back" may have the unique identifier "com.weare12.nowriteback" and define the permissions "tuddies" and "qbrstats." These permissions may be assigned to a user or role by designating "com.weare12.nowriteback.tuddies" and "com.weare12.nowriteback.qbrstats."

As an illustrative example, as users 110-1 within the virtual three-dimensional room 108-1 may each have different roles and corresponding permissions, their ability to access the different data elements within the virtual three-dimensional room 108-1 may differ according to their respective roles and corresponding permissions. For example, if a particular user within virtual three-dimensional room 108-1 is assigned the role of "student," and the panel 116 and corresponding data elements 118 are subject to a permission whereby only users having the role "faculty" are permitted to access the panel 116 and corresponding data elements 118, the particular user may be prevented from accessing the panel 116 and corresponding data elements 118. The panel 116 and corresponding data elements 118 may, in some instances, be obfuscated such that the particular user may be able to denote the presence of the panel 116 and the corresponding data elements 118 without being able to view any of the underlying data or otherwise interact with the panel 116 and corresponding data elements 118.

As noted above, the collaborative virtual environment service 102 may obtain real-time user behavior and room utilization data corresponding to user interactions with the different data elements within a corresponding virtual three-dimensional room and with other users within the virtual three-dimensional room. This monitoring and receipt of real-time user behavior and room utilization data may indicate how users are interacting with the myriad data elements present in the virtual three-dimensional room according to their roles and corresponding applicable permissions. The real-time user behavior and room utilization data may thus be used to dynamically train or otherwise update, in real-time, the machine learning algorithm or artificial intelligence implemented by the collaborative virtual environment service 102 to refine data source and room configuration recommendations for different users, including user 106, according to the user's role and any applicable permissions.

The data source and room configuration recommendations provided to the user 106 may be dynamically tailored according to the known role and permissions associated with the user 106 and generated according to the real-time user behavior, room utilization data, and applicable user and room permissions corresponding to the users within virtual three-dimensional rooms 108-1-108-N. As an illustrative example, if the virtual three-dimensional rooms 108-1-108-N are commonly utilized by users sharing the same or similar roles as user 106, the machine learning algorithm or artificial intelligence may provide a recommendation for user 106 to include, in the new virtual three-dimensional room 104, the various data elements 112-122 from the different virtual three-dimensional rooms 108-1-108-N, as the corresponding users sharing the same or similar roles as user 106 may be actively interacting with these data elements 112-122. As another illustrative example, if the user 106 shares a similar or identical role as users 110-2 within virtual three-dimensional room 108-2, and users 110-2 routinely interact with users 110-N within virtual three-dimensional room 108-N, the machine learning algorithm or artificial intelligence may provide a recommendation for user 106 to include, in the new virtual three-dimensional room 104, globes 120 and 122. Further, based on the permissions associated with the map 112 and graph 114 presented in virtual three-dimensional room 108-N and the role assigned to user 106, the machine learning algorithm or artificial intelligence may determine whether user 106 has the authority to access map 112 and graph 114. If the user 106 has such authority, given the known user behavior between users 110-2 and 110-N, the machine learning algorithm or artificial intelligence may further provide a recommendation for user 106 to include, in the new virtual three-dimensional room 104, the map 112 and graph 114. As illustrated in FIG. 1, users 110-2 within the virtual three-dimensional room 108-2 may not be interacting with panel 116 and corresponding data elements 118. Accordingly, the machine learning algorithm or artificial intelligence, based on this user behavior, may forego recommending introduction of the panel 116 and corresponding data elements 118 into the new virtual three-dimensional room 104.

The machine learning algorithm or artificial intelligence implemented by the collaborative virtual environment service 102 may further provide recommendations corresponding to positioning and layout of any recommended data elements within the new virtual three-dimensional room 104. For example, the real-time user behavior and room utilization data collected from the various virtual three-dimensional rooms 108-1-108-N may include data corresponding to the positioning of data elements within these virtual three-dimensional rooms 108-1-108-N, as well as data corresponding to any user manipulation of these data elements within these virtual three-dimensional rooms 108-1-108-N. For example, if users 110-2 and 110-N within virtual three-dimensional rooms 108-2 and 108-N, respectively, consistently or routinely rotate globe 122 to access a particular portion of globe 122, the machine learning algorithm or artificial intelligence may generate a recommendation whereby the globe 122 may be implemented in the new virtual three-dimensional room 104 in a manner such that the particular portion of the globe 122 is made immediately accessible to users interacting with the new virtual three-dimensional room 104. As another illustrative example, if users 110-1 and 110-N within virtual three-dimensional rooms 108-1 and 108-N, respectively, resize the map 112 when introducing graph 114, the machine learning algorithm or artificial intelligence may generate a recommendation whereby the map 112 may be implemented in the new virtual three-dimensional room 104 according to the resizing of the map 112 performed by users 110-1 and 110-N. Further, the machine learning algorithm or artificial intelligence may generate a corresponding recommendation for presenting the graph 114 according to the size and position of the map 112 within virtual three-dimensional rooms 108-1 and 108-N.

In an embodiment, when the collaborative virtual environment service 102 generates the new virtual three-dimensional room 104 in response to the request from the user 106, the collaborative virtual environment service 102 may introduce one or more panels that may be used to present the data source and room configuration recommendations to the user 106 within the new virtual three-dimensional room 104. These one or more panels may be two-dimensional displays that can be placed in the new virtual three-dimensional room 104. Panels may allow for classical graphical user interface (GUI) interactions with user interface (UI) elements such as buttons, sliders, textboxes, images, and videos. Through these one or more panels, the user 106 may evaluate the one or more data source and room configuration recommendations generated by the machine learning algorithm or artificial intelligence implemented by the collaborative virtual environment service 102. Further, through the one or more panels, the user 106 may determine whether to accept or reject the provided recommendations. For example, if the collaborative virtual environment service 102 presents, through a panel within the new virtual three-dimensional room 104, a recommendation to introduce map 112 and graph 114, but the user 106 opts to reject the recommendation (e.g., the user 106 dismisses the panel, the user 106 selects an option to reject the recommendation through the panel, etc.), the collaborative virtual environment service 102 may use this rejection of the recommendation as user feedback that may be used to dynamically retrain or otherwise update the machine learning algorithm or artificial intelligence such that, for similar users and/or virtual three-dimensional rooms, the likelihood of map 112 and graph 114 being recommended to these similar users and/or for similar virtual three-dimensional rooms is reduced.

In an embodiment, if the user 106 accepts a particular data source and room configuration recommendation, the collaborative virtual environment service 102 can implement the recommended data sources and/or room configurations within the new virtual three-dimensional room 104. For example, if the user 106 selects an option to accept the recommendation to introduce map 112 and graph 114 into the new virtual three-dimensional room 104, the collaborative virtual environment service 102 may introduce the map 112 and graph 114 into the new virtual three-dimensional room 104 according to the recommended configuration of the map 112 and graph 114 as determined based on other user interactions with the map 112 and graph 114 within other virtual three-dimensional rooms (e.g., interactions of users 110-1 and users 110-N with map 112 and graph 114 within virtual three-dimensional rooms 108-1 and 108-N, respectively). Further, the introduction of the map 112 and the graph 114 into the new virtual three-dimensional room 104 may be performed subject to any applicable permissions. For instance, if the user 106 is only authorized to read the map 112 and the graph 114 as a result of one or more applicable permissions, the collaborative virtual environment service 102 may present the map 112 and the graph 114 in a manner such that the user 106 may only read the map 112 and the graph 114 (e.g., the user 106 is unable to modify or write to the map 112 and the graph 114). The user's acceptance of the presented recommendation is used as feedback that may be used to dynamically reinforce or otherwise update the machine learning algorithm or artificial intelligence such that, for similar users and/or virtual three-dimensional rooms, the likelihood of map 112 and graph 114 being recommended to these similar users and/or for similar virtual three-dimensional rooms is maintained or increased.

In an embodiment, as the user 106 and other users present within the new virtual three-dimensional room 104 interact with different data elements within the new virtual three-dimensional room 104, the collaborative virtual environment service 102 may collect, in real-time, user behavior and room utilization data corresponding to the new virtual three-dimensional room 104. This user behavior and room utilization data may be evaluated by the collaborative virtual environment service 102 and used to generate new data points that may be used to dynamically, and in real-time, update the machine learning algorithm or artificial intelligence implemented by the collaborative virtual environment service 102 to generate data source and room configuration recommendations. Thus, as virtual three-dimensional rooms are implemented and used by various users associated with the collaborative virtual environment service 102, the collaborative virtual environment service 102 may dynamically obtain, in real-time, user behavior and room utilization data corresponding to these myriad virtual three-dimensional rooms and to these myriad users as these users interact with different data elements within these myriad virtual three-dimensional rooms and communicate amongst themselves within these virtual three-dimensional rooms and/or through these data elements. The voluminous amount of data may be dynamically processed, in real-time and as this data is obtained, by the collaborative virtual environment service 102 to dynamically, and in real-time, update the machine learning algorithm or artificial intelligence. This may enable the machine learning algorithm or artificial intelligence to dynamically provide more accurate recommendations to users within their respective virtual three-dimensional rooms in real-time.

In an embodiment, the collaborative virtual environment service 102 retrains or otherwise updates the machine learning algorithm or artificial intelligence in real-time or near real-time as feedback corresponding to data source and room configuration recommendations provided to different users is received. Returning to an earlier example where the user 106 opts to reject a recommendation to introduce map 112 and graph 114, the collaborative virtual environment service 102 may update the dataset used to dynamically train the machine learning algorithm or artificial intelligence to provide and annotate a data point corresponding to this recommendation to indicate that the recommendation was rejected. Further, if the user 106 selects one or more alternative data sources and/or room configuration for the new virtual three-dimensional room 104, the collaborative virtual environment service 102 may further annotate this particular data point to indicate the actual data sources and room configuration selected by the user 106 for their new virtual three-dimensional room 104. The updated training dataset may be processed and used to dynamically update one or more coefficients from the set of coefficients of the machine learning algorithm or artificial intelligence. The updated machine learning algorithm or artificial intelligence may be re-evaluated and iteratively retrained according to the one or more criteria, as described above, to obtain an updated machine learning algorithm or artificial intelligence that satisfies the one or more criteria. This process of re-training the machine learning algorithm or artificial intelligence may be performed in real-time or near real-time as data source and room configuration recommendations are generated and as feedback corresponding to these recommendations is received. This continuous and dynamic updating process may serve to reduce the potential for erroneous or undesired data source and room configuration recommendations.

In an embodiment, the collaborative virtual environment service 102, through the implementation of the aforementioned machine learning algorithm or artificial intelligence, can further provide real-time data source and room configuration recommendations to users within existing virtual three-dimensional rooms as these users interact with data elements and/or other users within these virtual three-dimensional rooms. For example, as user 106 interacts with one or more data elements and other users within the virtual three-dimensional room 104, the user's behavior (e.g., user interactions with the one or more data elements, user communications with other users, etc.) and the room utilization data corresponding to the virtual three-dimensional room 104 may be processed, in real-time, by the machine learning algorithm or artificial intelligence to generate new data source and room configuration recommendations that may be presented to the user 106 within the virtual three-dimensional room 104. As an illustrative example, if the user 106 interacts with the map 112 and graph 114 within the virtual three-dimensional room 104 and has a similar role to that of users 110-1 within virtual three-dimensional room 108-1, the collaborative virtual environment service 102, through the machine learning algorithm or artificial intelligence, may determine that the panel 116 and corresponding data elements 118 should be recommended to the user 106 since the user 106 shares a similar role with users 110-1 and the users 110-1 are routinely interacting with the panel 116 and the corresponding data elements 118.

Similar to the recommendation of different data sources and room configurations for a newly created virtual three-dimensional room, the collaborative virtual environment service 102 may introduce one or more panels that may be used to present the data source and room configuration recommendations to the user 106 within the virtual three-dimensional room 104. Through the one or more panels, the user 106 may determine whether to accept or reject the provided recommendations. For example, if the collaborative virtual environment service 102 presents, through a panel within the virtual three-dimensional room 104, a recommendation to introduce map 112 and graph 114, but the user 106 opts to reject the recommendation, the collaborative virtual environment service 102 may use this rejection of the recommendation as user feedback that may be used to dynamically retrain or otherwise update the machine learning algorithm or artificial intelligence such that, for similar users and/or virtual three-dimensional rooms, the likelihood of map 112 and graph 114 being recommended to these similar users and/or for similar virtual three-dimensional rooms is reduced. Alternatively, if the user 106 opts to accept the recommendation, and map 112 and graph 114 are introduced into the virtual three-dimensional room 104, the collaborative virtual environment service 102 may use this feedback to dynamically reinforce or otherwise update the machine learning algorithm or artificial intelligence such that, for similar users and/or virtual three-dimensional rooms, the likelihood of map 112 and graph 114 being recommended to these similar users and/or for similar virtual three-dimensional rooms is maintained or increased.

In an embodiment, the collaborative virtual environment service 102 automatically processes user behavior and room utilization data corresponding to the new virtual three-dimensional room 104 through the aforementioned one or more foundation models to construct a dynamic query that may be used to identify, in real-time, data source and room configuration options for the new virtual three-dimensional room 104. As an illustrative example, as users within the new virtual three-dimensional room 104 interact with different data elements within the new virtual three-dimensional room 104 and converse with one another with regard to security issues related to Lumen Field, the collaborative virtual environment service 102, through the aforementioned machine learning algorithm or artificial intelligence, can automatically process these interactions and conversations to dynamically generate a query that can be submitted to the one or more foundation models described above. For instance, the resulting dynamic query may include one or more keywords or anchors corresponding to "Lumen Field security." This dynamic query may be dynamically processed by the one or more foundation models to provide possible augmentations and/or enhancements that may be applied to the new virtual three-dimensional room 104. For example, if the new virtual three-dimensional room 104 implements a panel through which different video feeds corresponding to Lumen Field are presented, and the one or more foundation models determine that, based on user conversations within the new virtual three-dimensional room 104, that these users are likely interested in reviewing data associated with a particular location where a security incident occurred, the one or more foundation models can recommendation augmentation of the panel to introduce a new video feed that includes this particular location. Additionally, or alternatively, the one or more foundation models may provide one or more options to introduce new data sources to the new virtual three-dimensional room 104 that may allow the users within the new virtual three-dimensional room 104 to review any available data corresponding to the security incident (e.g., maps, video and/or audio feeds, etc.).

In an embodiment, if the one or more foundation models identify one or more new data sources that may be introduced into the new virtual three-dimensional room 104 based on the dynamic query submitted by the collaborative virtual environment service 102, the one or more foundation models can automatically generate, within the new virtual three-dimensional room 104, one or more new data elements through which these new data sources may be accessed. For example, if the one or more foundation models determine that a data source corresponding to an active video feed is available that may assist users within the new virtual three-dimensional room 104 to monitor the security measures implemented at Lumen Field, and this active video feed has not been previously implemented within the new virtual three-dimensional room 104, the one or more foundation models may automatically generate a new data element within the new virtual three-dimensional room 104 that allows these users to access and review the active video feed. In some instances, rather than automatically generating new data elements within the new virtual three-dimensional room 104 in response to the dynamically generated query, the one or more foundation models may automatically prompt the users within the new virtual three-dimensional room 104 to determine whether to introduce the new data elements into the new virtual three-dimensional room 104. For example, the one or more foundation models may automatically introduce a two-dimensional panel to the new virtual three-dimensional room 104 that includes a prompt to users to indicate whether these users would like to introduce the recommended data element to the new virtual three-dimensional room 104. If the users respond to the prompt by indicating they approve of the introduction of the new data source, the one or more foundation models may automatically generate one or more data elements corresponding to this data source within the new virtual three-dimensional room 104 according to the processes described above for generating and presenting data elements within virtual three-dimensional rooms.

In some instances, the collaborative virtual environment service 102, through the one or more foundation models, can provide options for different virtual three-dimensional rooms according to the query dynamically generated based on user interactions within the new virtual three-dimensional room 104. Returning to the aforementioned example, whereby users within the new virtual three-dimensional room 104 are engaged in conversations related to Lumen Field security, the one or more foundation models may automatically determine, based on the query dynamically generated according to these conversations, that a new virtual three-dimensional room may be implemented to better address these users' requirements for reviewing the security measures at Lumen Field. Accordingly, the one or more foundation models may dynamically, and in real-time, generate one or more virtual three-dimensional room options that include different data sources and corresponding elements that may be implemented within a new virtual three-dimensional room to better allow these users to review the security measures at Lumen Field.

In an embodiment, the one or more foundation models can determine whether another virtual three-dimensional room that includes the identified one or more data sources is currently in use by other users. For example, if the dynamically generated query corresponds to a discussion related to Lumen Field security measures, and the one or more foundation models identify an existing virtual three-dimensional room that includes data elements corresponding to different data sources related to Lumen Field security (e.g., active video feeds, maps, communications channels associated with a police precinct assigned to Lumen Field, etc.), the one or more foundation models may automatically recommend a merger of the new virtual three-dimensional room 104 with this existing virtual three-dimensional room. For instance, if the one or more foundation models identify another virtual three-dimensional room that may be merged with the new virtual three-dimensional room 104 in order to provide the identified one or more data elements to users within the new virtual three-dimensional room 104 and to bring disparate users together to coordinate their efforts, the one or more foundation models may automatically transmit an invitation to the users within the two virtual three-dimensional rooms to merge the two virtual three-dimensional rooms into a single virtual three-dimensional room. Through this single virtual three-dimensional room, these users may interact with the collective data elements and with each other subject to any applicable roles and permissions, as described above.

Figure 2:
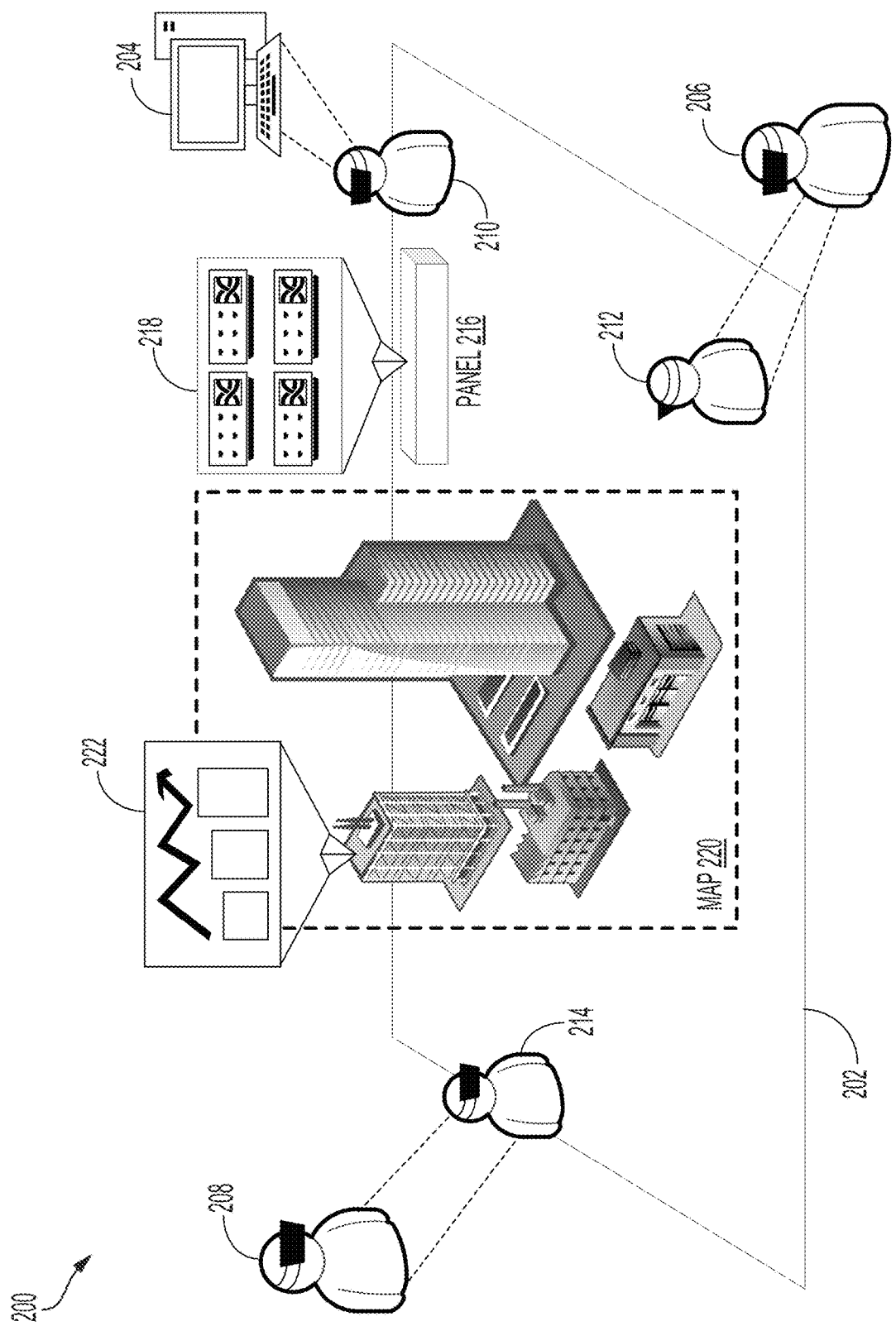
FIG. 2 shows an illustrative example of an environment in which a group of users interact with various elements collaboratively in real-time in a virtual three-dimensional environment in accordance with at least one embodiment.

FIG. 2 shows an illustrative example of an environment 200 in which a group of users 204-208 interact with various elements collaboratively in real-time in a virtual three-dimensional environment in accordance with at least one embodiment. As noted above, the collaborative virtual environment service may provide users with geospatially-aware environments that allow these users to visualize multi-domain spaces through which users may interact with various elements simultaneously in real-time. The collaborative virtual environment service may support virtual reality systems, augmented reality systems, and desktop systems simultaneously. For instance, as illustrated in FIG. 2, user 204 may utilize a desktop system to access the virtual three-dimensional room 202, whereby the virtual three-dimensional room 202 is represented on the desktop system using a two-dimensional display. The user 204 may utilize a three-dimensional mouse to navigate their avatar 210 within the virtual three-dimensional room 202. As another example, user 206 may utilize an augmented reality system, whereby elements of the three-dimensional room 202 are represented within the user's physical environment through use of augmented reality hardware devices (e.g., augmented reality goggles, etc.). The user's interactions within the augmented reality environment may be mirrored within the virtual three-dimensional room 202 and represented via their avatar 212. As yet another example, user 208 may utilize a virtual reality system, whereby the user 208 may be immersed in the virtual three-dimensional room 202 from a first-person perspective and, via movements detected by the virtual reality system, move their avatar 214 within the virtual three-dimensional room 202.

As illustrated in FIG. 2, a virtual three-dimensional room 202 may include the containers and active users 204-208 interacting on that data. The virtual three-dimensional room 202 may dictate what networking data propagates to which users. Each user 204-208 may have a unique virtual three-dimensional environment in which the virtual three-dimensional room 202 is loaded. This virtual three-dimensional environment may house a user's rooms that the user may interact with. A user's embodiment within its virtual three-dimensional environment may house its digital movement and generic information such as their display name, profile picture, session identifier, roles, and permissions.

Each user may have a corresponding avatar (e.g., users 204-208 have corresponding avatars 210-214, respectively) that represents the user's visual embodiment within a virtual three-dimensional environment. Within a virtual three-dimensional room 202, an avatar of a user within the room may be displayed that may speak, look, and react to objects in their vicinity. An avatar may have customization functionality so that users can be properly represented within a virtual three-dimensional room 202. For instance, a user may customize their avatar to appear as a three-dimensional representation of the user's actual appearance. In some instances, a user may customize their avatar to provide a live video feed of the user that may be presented to other users within a room.

Within a room, a virtual head may be presented that correlates to a user's head in the real world. In virtual reality implementations, the virtual head may track a user's physical presence and provides a digital orientation. This may allow a user to see and navigate the space as well as allow others to identify what the user is focused on at any given time. In addition to a virtual head, a virtual hand element may be implemented for a user, which may correlate with the user's hands in the real world. In virtual reality implementations, the virtual hand may track the user's physical presence and digital orientation. Further, this may allow the user to see and interact with items, whether that is using a controller in the user's hands, physical hand gestures, or digitally grabbing objects in that space.

A pointer element may be provided to extend a user's length of interaction for grabbing, selecting, dragging, scrolling, and the like. The pointer element may be used with a mouse, virtual reality controllers, or lasers digitally extending from a digital hand element.

Voice elements may be recorded and propagated to all users in the rooms that a user is currently in. For instance, if user 204 generates a voice element within the virtual three-dimensional room 202, the voice element may be automatically propagated to the other users 206-208 within the virtual three-dimensional room 202. This may allow users 204-208 to speak to one another in real-time through use of these voice elements. In an embodiment, the collaborative virtual environment service may automatically, and in real-time, may monitor these voice elements using NLP or other machine learning algorithms or artificial intelligence to automatically process these voice elements to determine user behaviors within the virtual three-dimensional room 202, as described in greater detail herein.

Panels, such as panel 216, may be two-dimensional displays that can be placed in the virtual three-dimensional room 202. Panels may allow for classical GUI interactions with UI elements such as buttons, sliders, textboxes, images, and videos. Panels may also support more nuanced features such as web cameras, shared desktops, server-sided browsers, and the like.

The map element 220 may display a geolocated virtualized display of real-world locations from various endpoints and providers in the three-dimensional environment (e.g., virtual three-dimensional room 202). The map element 220 may not be flat but rather include three-dimensional projected data to replicate and describe the locations in the physical world. The map element 220 may support active display of the map as a projected and geolocated globe that can support the curvature of the Earth, the Moon, Mars, or any other celestial body in the same visual space. The map element 220 may bridge projected data of water, terrain, underground features, man-made and natural satellites, and other bodies in the solar system in natural relation to each other. The display of the map element 220 may be supported by tile providers, such as a web map tile service or other entities that provide geospatial-intelligence data.

A map element 220 may be associated with map data (e.g., maps obtained from mapping services such as Google Maps®, MapQuest®, etc.), which may be additive data provided in addition to data provided by various providers. The map data may include data with a given geolocation. Geolocated data may be represented through longitude, latitude, vertical position, and vertical type. Vertical types may allow users to define how a geolocated item is projected on the map element 220. Map data may include map overlays, map markers, and map drawings. Map overlays display a texture that drapes over the features of the map element 220 at the correct geolocated coordinates. Map markers may each represent a single geolocated point at the correct geolocated coordinates. Supplemental data may be attached to markers (e.g., meshes, point clouds, event containers, etc.). Event containers may bring up additional panels, graphs, an additional map, and further containers. Map drawings may represent sequences of geolocated points that can optionally be displayed as a Bezier curve for seamless curvature.

Similar to a map element 220, a globe element (such as globe elements 120 and 122 illustrated in FIG. 1) may be introduced. A globe element may provide a generalized version of geolocated data displayed on a globe diorama. This may provide general context and awareness at a macro scale. The globe element may support globe markers and globe drawings, which may be analogous to the map markers and map drawings described above.

Other three-dimensional elements may be introduced in a virtual three-dimensional room 202. For instance, generic three-dimensional content may be loaded into a room, such as visual indicators, Lidar data, architecture, and the like. For instance, a user may import and display a mesh-based model within a virtual three-dimensional room 202. Further, a user may import and display point-based content, such as point clouds, within the virtual three-dimensional room 202 and scale the point-based content as needed.

The collaborative virtual environment service may further support skybox elements. Skybox elements may include content that surrounds the user in all directions. This may be used to replace the outer surrounds of a virtual space with, for example, real world 360-degree content. In some instances, a user may introduce a skybox element that simulates an office environment, a control center environment, and the like. When a component of a skybox element is not active, the component may be displayed as a bubble floating in space. At any point, a user may activate the content to surround the user. This may allow users and plugins to seamlessly swap out the current surrounding content. Skybox elements may include video skyboxes, street view skyboxes, texture skyboxes, video stream skyboxes, and the like.

Graph elements (such as graph element 114 illustrated in FIG. 1) may allow for generic linking of nodes in a three-dimensional space with dynamic edge linkings where appropriate. A graph node may represent a three-dimensional position in relation to the center of the graph. Similar to the aforementioned map marker, supplemental data can be attacked to graph nodes such as meshes, point clouds, and event containers. These containers may, in turn, be used to bring up additional panels, graphs, additional maps, and further containers. Graph edges may specifically link nodes that are in the same graph to provide relational context.

The collaborative virtual environment service may further support generic edge elements. A generic edge element may be used to link any collaborative virtual environment service data to other content. A user can create an edge element from a user's head to a panel, a map marker to a graph node, a map marker to a panel, a container to another container, and the like. Edge elements may dynamically store themselves at the highest level of an element tree to have their links as children. Thus, if an edge element links across containers, the edge element cannot be saved with that data. There may need to be a union upon the containers by creating copies and linking or reattach the containers to a related container. If no container is found, edge elements may continue up to the room element or space element which is not persistent.

In an embodiment, as users 204-208 use their respective avatars 210-214 to interact with any of the data elements present within the virtual three-dimensional room 202, the collaborative virtual environment service can collect, in real-time, user behavior and room configuration data corresponding to these interactions within the virtual three-dimensional room 202. The collaborative virtual environment service may use this user behavior and room configuration data corresponding to these interactions as input to a machine learning algorithm or artificial intelligence (as described above in connection with FIG. 1) to generate recommendations for additional and/or alternative data sources that may be introduced into the virtual three-dimensional room 202. Further, the machine learning algorithm or artificial intelligence may be used to generate recommendations for modifying the configuration of the virtual three-dimensional room 202 according to the user behaviors of users 204-208 corresponding to their interactions with the myriad data elements within the virtual three-dimensional room 202 and with one another (e.g., voice elements, active communications sessions, etc.).

The recommendations generated by the collaborative virtual environment service may be user-specific and/or room-specific. For example, the collaborative virtual environment service may use individual user behaviors and characteristics as input to the machine learning algorithm or artificial intelligence to generate user-specific recommendations for data sources that may be introduced into the virtual three-dimensional room 202 for their use. As an illustrative example, if user 204 is a faculty member and users 206-208 are students associated with the faculty member, and user 204 routinely interacts with panel 216 and corresponding data elements 218 to evaluate student performance, the collaborative virtual environment service may use the user's role as a faculty member, their interaction with the panel 216 and corresponding data elements 218, and their communications with users 206-208 as input to the machine learning algorithm or artificial intelligence to generate recommendations corresponding to additional and/or alternative data sources or elements that may be introduced into virtual three-dimensional room 202 for use by the user 204. These recommendations may be generated regardless of the roles of the other users 206-208, who may not have the requisite permissions to interact with the recommended data sources and/or elements recommended to the user 204. Returning to the aforementioned illustrative example, the collaborative virtual environment service may provide, to user 204, a recommendation to introduce a new data element that may be used to evaluate student performance. This new data element may be subject to a specific set of permissions, whereby only users having an assigned role as a faculty member (e.g., user 204) may access this new data element. Thus, while users 206-208 may be unable to interact with this new data element, the new data element may still be recommended to user 204 as a result of their individual interactions with the myriad data elements and the other users 206-208 within the virtual three-dimensional room 202.

A recommendation generated by the collaborative virtual environment service may also be provided to multiple users within a virtual three-dimensional room 202 based on their collective user behaviors and characteristics. Returning to the aforementioned illustrative example, where user 204 is a faculty member and users 206-208 are students associated with the faculty member, if users 204-208 actively interact with map 220 and graph 222 as part of an educational environment (e.g., a lecture, a seminar, a group project, etc.), the collaborative virtual environment service may use these interactions, as well as the user characteristics corresponding to users 204-208 (e.g., roles, demographics, etc.), as input to the machine learning algorithm or artificial intelligence to generate a recommendation that may be presented to users 204-208 within the virtual three-dimensional room 202. The recommendation, for example, may indicate that a data element that may correspond to the interactions within the virtual three-dimensional room 202 should be introduced to supplement or otherwise enhance the educational environment. As an illustrative example, if the users 204-208 are engaged with one or more data elements corresponding to plate tectonics, the collaborative virtual environment service may recommend a video element that provides a demonstration of plate shifting and the resulting impact of plate shifting.

In an embodiment, a recommendation for a particular data element and/or room configuration provided to multiple users within a virtual three-dimensional room 202 can be subject to one or more acceptance criteria such that, if these one or more acceptance criteria are not satisfied, the recommendation is deemed to be rejected by the multiple users. For example, if the collaborative virtual environment service presents a recommendation to users 204-208 for introduction of the aforementioned video element, the collaborative virtual environment service may require that a quorum of users 204-208 approve of the recommendation in order for the video element to be added to the virtual three-dimensional room 202. As another example, if the collaborative virtual environment service presents a recommendation to users 204-208 for introduction of the aforementioned video element, the collaborative virtual environment service may require a simple majority of users 204-208 to approve of the recommendation in order for the video element to be added to the virtual three-dimensional room 202. Other acceptance criteria may indicate a minimum number of users required for acceptance of a recommendation, a required number of responses to the recommendation within a pre-defined period of time, a requirement that all users agree to the recommendation, and the like.

In an embodiment, the collaborative virtual environment service can further use this user behavior and room configuration data corresponding to these interactions within the virtual three-dimensional room 202 to dynamically, and in real-time, update the machine learning algorithm or artificial intelligence implemented by the collaborative virtual environment service to generate data source and room configuration recommendations. For example, as users 204-208 interact with the various data elements in the virtual three-dimensional room 202 (e.g., panel 216, data elements 218, map 220, graph 222, etc.), the collaborative virtual environment service may obtain, in real-time or near real-time, the user behavior and room configuration data corresponding to these interactions to further enhance, in real-time or near real-time, the dataset used by the machine learning algorithm or artificial intelligence to generate recommendations for other users and other virtual three-dimensional rooms implemented by the collaborative virtual environment service. The updated dataset may be dynamically processed, in real-time or near real-time and as this data is obtained, by the collaborative virtual environment service to dynamically, and in real-time, update the machine learning algorithm or artificial intelligence. This may enable the machine learning algorithm or artificial intelligence to dynamically provide improved and tailored recommendations to users within their respective virtual three-dimensional rooms in real-time.

In an embodiment, the collaborative virtual environment service can use the user behavior and room configuration data corresponding to these interactions within the virtual three-dimensional room 202 to dynamically, and in real-time, generate a query that may be processed through one or more foundation models to dynamically provide users 204-208 with different options for augmenting and/or enhancing the virtual three-dimensional room 202. As noted above, if the one or more foundation models identify one or more data sources that may be germane to the activities within the virtual three-dimensional room 202 (as determined based on the query and, in turn, the user behavior and room configuration data), the one or more foundation models may automatically perform one or more actions to recommend these data sources to users 204-208. For instance, the one or more foundation models may automatically create one or more new data elements within the virtual three-dimensional room 202 to introduce these identified data sources to users 204-208. As an illustrative example, if the one or more foundation models determine, based on the submitted query, that a data source corresponding to a video feed is available to the users 204-208, the one or more foundation models may automatically generate a new data element that incorporates this identified video feed within the virtual three-dimensional room 202. This may allow users 204-208 to access this new data element and review the video feed (subject to any applicable roles and/or permissions). As another illustrative example, if the one or more data sources identified by the one or more foundation models may be implemented through an existing data element within the virtual three-dimensional room 202, the one or more foundation models, through this existing data element, may automatically prompt the users 204-208 to determine whether to incorporate these newly identified data sources into the existing data element. If the users 204-208 accept these new data sources for the data element, the one or more foundation models may automatically, and in real-time, update the data element to incorporate these new data sources.

As noted above, based on the query dynamically generated based on the user behavior and room configuration data, the one or more foundation models can recommend a merger of the virtual three-dimensional room 202 with another active virtual three-dimensional room that implements different data elements that may be of interest to users 204-208. The one or more foundation models may provide users 204-208 with an indication of this other active virtual three-dimensional room (e.g., data elements implemented in the other active virtual three-dimensional room, information corresponding to the purpose of the other active virtual three-dimensional room, etc.) as well as a prompt to determine whether to proceed with the merger of the virtual three-dimensional rooms. This prompt may be provided to users 204-208 and to the other users within the other active virtual three-dimensional room to determine whether the merger may be performed. This merger may be subject to one or more criteria. For instance, in order for the merger to be performed, a quorum of users 204-208 and the other users within the other active virtual three-dimensional room may be required. As an alternative example, the collaborate virtual environment service may require a simple majority of users within each virtual three-dimensional room to approve of this merger. Other acceptance criteria may indicate a minimum number of users required for acceptance of the proposed virtual three-dimensional room merger. If the collaborative virtual environment service determines that the proposed merger has been approved, the collaborative virtual environment service may automatically merge the virtual three-dimensional room 202 with the other active virtual three-dimensional room. Through this merged virtual three-dimensional room, users 204-208 may interact with the other users associated with the other active virtual three-dimensional room subject to any rules or permissions and user roles. Further, users 204-208 and these other users may interact with the data elements in the merged virtual three-dimensional room subject to any applicable rules or permissions and user roles.

Figure 3:
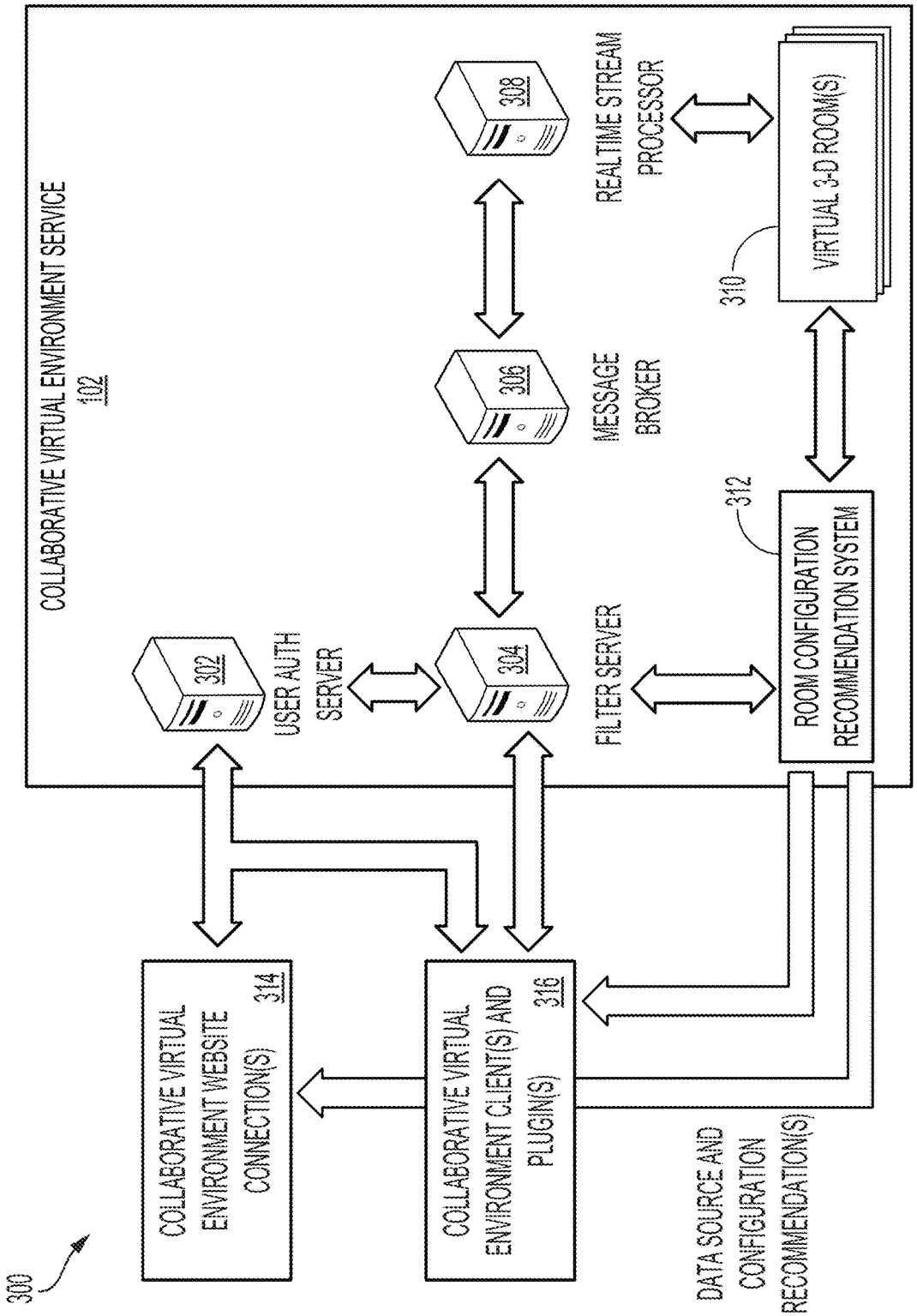
FIG. 3 shows an illustrative example of an environment in which a collaborative virtual environment service provides various micro-services for implementation of collaborative virtual three-dimensional environments and for providing data source and room configuration recommendations in accordance with at least one embodiment.

FIG. 3 shows an illustrative example of an environment 300 in which a collaborative virtual environment service 102 provides various micro-services for implementation of collaborative virtual three-dimensional environments and for providing data source and room configuration recommendations in accordance with at least one embodiment. In the environment 300, a client sends user-inputted credentials to a user account and authentication server 302 to request access to a virtual three-dimensional room 310 of the collaborative virtual environment service 102. The user account and authentication server 302, in an embodiment, operates as an OAuth2 authorization server providing JWTs or other cryptographic tokens to authenticating clients, which can be verified by a filter server 304 of the collaborative virtual environment service 102.

The client may submit its credentials via a collaborative virtual environment website connection 314 or directly to the user account and authentication server 302. In response to obtaining a JWT or other cryptographic token from the user account and authentication server 302, a client may use the token in the authorization header of a websocket request to the filter server 304, which may result in a room creation message being made through the websocket.

As noted above, the user account and authentication server 302 may be the source of authentication for clients of the collaborative virtual environment service 102. Accounts with the collaborative virtual environment service 102 may be registered and administered via a web portal, which may be accessed via a collaborative virtual environment website connection 314. In some instances, the registration process may be open by default but may be restricted to administrative users, whereby administrative users may be required to access the collaborative virtual environment service 102 to register account on behalf of other users. If a user utilizes a service client to access the collaborative virtual environment service 102, an OAuth2 client credentials flow may be used, and the user account and authentication server 302 may respond with a JWT or other cryptographic token if the credentials supplied by the user are valid. In some instances, the user account and authentication server 302 utilizes a separate database to maintain account information for the various users of the collaborative virtual environment service 102.

As noted above, the filter server 304 provides the ability to create and join virtual three-dimensional rooms 310, forward messages to other users in a virtual three-dimensional room 310, allows reconnection, and verifies JWTs or other cryptographic tokens upon connection. On server boot, the filter server 304 connects to the user account and authentication server 302 to obtain the public cryptographic key of the user account and authentication server 302. This public cryptographic key is used to validate the digital signatures of the JWTs or other cryptographic tokens that clients provide without need to send requests to the user account and authentication server 302 for validation.

In an embodiment, the filter server 304 is implemented without a user interface (UI) and is configured to support websocket connections from clients. A client seeking to access a virtual three-dimensional room may be required to present a valid JWT or other cryptographic token in the authorization header of a websocket connection request to the filter server 304. Once a user is connected to the filter server 304, the filter server 304 may create a UserSession entity in its database and sends a message on a message broker topic (e.g., "user-joined-up") maintained by a message broker 306 to indicate that a new user has connected and requires a unique session identifier. In an embodiment, the real time stream processor 308 may be subscribed to this topic and may detect this message. In response to this message, the real time stream processor 308 may generate a session identifier for the user and sends the response on another message broker topic (e.g., "user-joined-down") maintained by the message broker 306. The filter server 304 may be subscribed to this particular topic and may detect this message from the real time stream processor 308. In response to receiving this message from the topic, the filter server 304 may update its database with the session identifier and forwards the message to the client that submitted the request.

Once the unique session identifier has been assigned, the client may be able to join or create a virtual three-dimensional room 310. For instance, a client may submit a request to the filter server 304 to join an existing virtual three-dimensional room. The request may include a unique room identifier corresponding to the virtual three-dimensional room that the client wishes to join. In response to the request, the filter server 304 may determine whether the specified room exists. If the specified room does not exist, the filter server 304 may return an error message. However, if the specified room exists, the filter server 304 may transmit a room join request message to a topic maintained by the message broker 306. The real time stream processor 308 may obtain, from the topic, the room join request message and process the request. The real time stream processor 308 may return a snapshot of the room, which may be loaded by the client.

If a client submits a request to create a virtual three-dimensional room, the filter server 304 may determine whether the room does not already exist. For instance, the filter server 304 may check the room table within its in-memory database to determine whether a room having the name provided by the client currently exists. If so, the filter server 304 may return an error message to the client. However, if the room does not currently exist (e.g., the request is valid), the filter server 304 creates new topics on the message broker 306 with a globally unique identifier (GUID) appended to the name of these topics (e.g., "element-changes-up-{GUID}," "element-changes-down-{GUID}," etc.). The filter server 304 may further send a message on a topic (e.g., "room-changes-up") to indicate to the real time stream processor 308 that it is to begin consuming and producing messages on these topics. When the real time stream processor 308 receives the room request, it attaches its consumer and producer and sends a room snapshot to another topic (e.g., "room-changes-down"). The filter server 304 may obtain the room snapshot from this topic and forwards the room snapshot to the client, which then enters the virtual three-dimensional room.

In an embodiment, the filter server 304 further provides the room snapshot to a room configuration recommendation system 312 implemented by the collaborative virtual environment service 102. The room configuration recommendation system 312 may be implemented on a computer system or other system (e.g., server, virtual machine instance, etc.) of the collaborative virtual environment service 102. Alternatively, the room configuration recommendation system 312 may be implemented as an application or other process executed on a computing system of the collaborative virtual environment service 102. In some instances, the room configuration recommendation system 312 may be implemented using one or more special-purpose components of the collaborative virtual environment service 102, whereby these one or more special-purpose components may perform the operations described herein. As described in greater detail herein, the room configuration recommendation system 312 may implement a machine learning algorithm or artificial intelligence that is dynamically trained, in real-time, to generate recommendations for data elements and room configurations that may be implemented within any virtual three-dimensional room 310. Thus, if the room configuration recommendation system 312 is implemented using one or more special-purpose components, these one or more special-purpose components may dynamically generate recommendations for data elements and room configurations for different virtual three-dimensional rooms concurrently for any number of users. This continuous and real-time or near-time generation of recommendations by the room configuration recommendation system 312 may provide improved performance of the collaborative virtual environment service 102 as users interact with different virtual three-dimensional rooms, providing relevant recommendations that may be implemented to further augment and improve the functionality of these virtual three-dimensional rooms according to user behaviors.

In response to receiving the room snapshot from the filter server 304, the room configuration recommendation system 312 may prompt the client 316 to provide additional information regarding the purpose of the virtual three-dimensional room. For example, when the client 316 submits their request to create a virtual three-dimensional room, the room configuration recommendation system 312 may prompt the client 316 to indicate what the purpose of the virtual three-dimensional room will be. As an illustrative example, if the client 316 indicates that the virtual three-dimensional room will be used for educational purposes, the room configuration recommendation system 312 may use this information and the obtained room snapshot to recommend different data elements and room configurations that are tailored for an educational environment. As another illustrative example, if the client 316 indicates that the virtual three-dimensional room will be used to assist in a criminal investigation at a particular location, the room configuration recommendation system 312 may use this information, as well as the room snapshot, to recommend different data elements and room configurations that are conducive to data gathering for such investigations and that may be specific to the criminal investigation the client 316 is a part of (subject to any applicable permissions or other forms of vetting).

In an embodiment, the room configuration recommendation system 312 can leverage one or more foundation models to dynamically provide clients, such as client 316, with different virtual three-dimensional room options that may be used to implement virtual three-dimensional rooms for these clients. Through the one or more foundation models, the room configuration recommendation system 312 may prompt clients to submit different queries that may be processed by the one or more foundation models to generate these virtual three-dimensional room options. For instance, using an NLP algorithm, the room configuration recommendation system 312 may receive and process a client request for a new virtual three-dimensional room. In response to this natural language query, the one or more foundation models (through the NLP algorithm) may identify one or more keywords or anchors that may be used by the foundation model to automatically generate one or more virtual-three-dimensional room configuration options that may be offered to the client 316. Based on these one or more keywords or anchors, the one or more foundation models may automatically identify, from different data sources utilized by the one or more foundation models and used to train the one or more foundation models, any relevant virtual three-dimensional room configuration options and corresponding data elements that may be implemented in a new virtual three-dimensional room that may satisfy the needs expressed by the client 316 in their request. Further, the one or more foundation models may automatically identify any open source or public data sources that may be used to generate one or more data elements that may be included in the new virtual three-dimensional room.

The room configuration recommendation system 312, in response to receiving these one or more virtual three-dimensional room options from the one or more foundation models, may provide these options to the client 316. In an embodiment, to introduce these options to the client 316, the room configuration recommendation system 312 may transmit an element change to the filter server 304 that includes the generated options and the configuration of any data elements through which these options may be presented, as described herein. If the client 316 selects a particular virtual three-dimensional room option from the options provided, the room configuration recommendation system 312 may send one or more element changes to the filter server 304 to implement the new virtual three-dimensional room according to the selection option, as described in greater detail herein. Further, the client's acceptance of this option may be used to dynamically update the one or more foundation models.

In an embodiment, the client 316 can modify their query in real-time to dynamically update the options presented to the client 316. If the client 316 modifies their query, the room configuration recommendation system 312, through the one or more foundation models, can automatically, and in real-time, dynamically update the previously provided virtual three-dimensional room options provided to the client 316 according to these refinements to the query. For instance, the one or more foundation models (through the NLP algorithm) may identify one or more new and/or alternative keywords or anchors that may be used by the one or more foundation models to automatically identify, from the different data sources utilized by the one or more foundation models and used to train the one or more foundation models, any new and/or alternative virtual three-dimensional room configuration options and corresponding data elements that may be implemented in a new virtual three-dimensional room that may satisfy the revised query. The room configuration recommendation system 312 may transmit new element changes to the filter server 304 that include the new and/or alternative options and the configuration of any data elements through which these options may be presented. Thus, as the client 316 modifies their query, the room configuration recommendation system 312 may automatically, and in real-time, update any provided options to allow the client 316 to visually review these options within the virtual three-dimensional environment and determine which one or more options to accept.

As noted above, the collaborative virtual environment service 102 may introduce one or more panels that may be used to present the data source and room configuration recommendations to the user (e.g., client 316) within the virtual three-dimensional room. In an embodiment, to introduce these one or more panels to the virtual three-dimensional room 310, the room configuration recommendation system 312 may transmit an element change to the filter server 304 that includes the generated recommendation and the configuration of the panel for presentation of the recommendation to the client 316. The filter server 304 may write this element change to the "element-changes-up-{GUID}" topic maintained by the message broker 306 and corresponding to the virtual three-dimensional room 310. The RSP 308 may read this element change data from the topic maintained by the message broker 306 and echoes the "element-changes-down-{GUID}" topic maintained by the message broker 306 for dissemination to the client 316. The filter server 304 obtains, from the "element-changes-down-{GUID}" topic maintained by the message broker 306, this element change and provides the element change to the client 316. This may cause the client 316 to implement the element change in order to present the recommendation to the user of the client 316 within the virtual three-dimensional room 310.

In an embodiment, the element changes corresponding to data source and room configuration recommendations include an additional field of metadata that may indicate that these element changes are implemented by the room configuration recommendation system 312 and not by other users or clients. The filter server 304 can track this field of metadata to differentiate element changes corresponding to the provided recommendation from element changes corresponding to other data elements presented within the virtual three-dimensional room 310. For instance, if the client 316 interacts with the panel corresponding to the recommendation supplied by the room configuration recommendation system 312, the filter server 304 may detect the field of metadata corresponding to the recommendation and send the element change corresponding to this interaction to the room configuration recommendation system 312. The element change may indicate whether the client 316 has accepted or rejected the presented recommendation.

If the room configuration recommendation system 312 determines that the client 316 has accepted the presented recommendation, the room configuration recommendation system 312 may send one or more element changes to the filter server 304. These one or more element changes may correspond to the recommended data elements that may be introduced in the virtual three-dimensional room 310 according to the previously presented recommendation. In response to receiving an element change from the room configuration recommendation system 312, the filter server 304 writes the element change to the "element-changes-up-{GUID}" topic maintained by the message broker 306 and corresponding to the virtual three-dimensional room 310. The RSP 308 may read the element change data from the topic maintained by the message broker 306 and echoes to the "element-changes-down-{GUID}" topic maintained by the message broker 306 for dissemination to the users in the virtual three-dimensional room 310, including client 316.

The filter server 304 may obtain, from the "element-changes-down-{GUID}" topic maintained by the message broker 306, any element changes implemented by other users of the virtual three-dimensional room 310 and the room configuration recommendation system 312. For each change, the filter server 304 may add an additional field of metadata (e.g., a broker offset), which is the offset in the topic that corresponds with the message. Clients may track this offset for reconnection purposes such that the client may be able to request messages beginning at the broker offset on reconnection based on the offset of the last message received. The filter server 304 may provide these element changes with the broker offset to the client 316 to cause the client 316 to implement these element changes within the virtual three-dimensional room 310.

In an embodiment, when users interact with objects in a virtual three-dimensional room 310, each change is transmitted to the filter server 304 to forward these interactions to other users within the room 310. For instance, the filter server 304 may read and write metadata to the message before passing it on. For each element change that a client sends, the client sends an auto-incrementing client offset, which is stored in the UserSession on the filter server 304. This offset may be used for reconnection purposes in order to prevent the loss of client changes in the event of a disconnection and to prevent messages from being processed more than once.

In an embodiment, as new element changes are written to the "element-changes-up-{GUID}" topic maintained by the message broker 306 and corresponding to the virtual three-dimensional room 310, the filter server 304 may provide, in real-time, these element changes to the room configuration recommendation system 312. The room configuration recommendation system 312 may dynamically process these element changes in real-time to identify any user behaviors and room utilization data for the virtual three-dimensional room 310. These user behaviors and room utilization data may be used by the room configuration recommendation system 312 to generate new recommendations corresponding to different data elements and room configurations that may be implemented within the virtual three-dimensional room 310. These new recommendations may be provided to the client 316 and any other users associated with the virtual three-dimensional room 310 through the aforementioned process described above. Further, the room configuration recommendation system 312 may use these element changes to dynamically update, in real-time, the dataset used by the room configuration recommendation system 312 to train the machine learning algorithm or artificial intelligence implemented to generate the aforementioned recommendations.

In an embodiment, the room configuration recommendation system 312 automatically processes the identified user behaviors and utilization data for the virtual three-dimensional room 310 in real-time through the one or more foundation models to dynamically construct a new query that may be used to identify data source and room configuration options for the virtual three-dimensional room 310. The new query can be processed by the one or more foundation models to provide possible augmentations and/or enhancements that may be applied to the virtual three-dimensional room 310. For instance, the one or more foundation models may provide one or more options to introduce new data sources to the virtual three-dimensional room 310 that may be useful to the users within the virtual three-dimensional room 310. These new options may be provided by the room configuration recommendation system 312 to the client 316 and any other users associated with the virtual three-dimensional room 310 through the aforementioned process described above.

In some instances, the one or more foundation models can automatically introduce any element changes to the virtual three-dimensional room 310 in response to the dynamic query (e.g., modification to existing data elements within the virtual three-dimensional room 310, introduction of new data elements to the virtual three-dimensional room 310, etc.). For instance, if the one or more foundation models identify a new data source that may be introduced to the virtual three-dimensional room 310 through implementation of a new data element, the one or more foundation models may automatically generate and send one or more element changes to the filter server 304. The one or more element changes may represent the new data element that is to be introduced to the virtual three-dimensional room 310, as well as data corresponding to the data source that is to be associated with the new data element. The filter server 304 may write these one or more element changes to the "element-changes-up-{GUID}" topic maintained by the message broker 306 and corresponding to the virtual three-dimensional room 310. The RSP 308 may read the element change data from the topic and may echo to the "element-changes-down-{GUID}" topic maintained by the message broker 306 for dissemination to the users in the virtual three-dimensional room 310. Thus, as users within the virtual three-dimensional room 310 interact with different data elements within the virtual three-dimensional room 310 and with one another, the one or more foundation models associated with the room configuration recommendation system 312 may continuously, and in real-time, process user behaviors and utilization data associated with the virtual three-dimensional room 310 to automatically modify or introduce data elements to the virtual three-dimensional room 310.

In an embodiment, a client periodically polls the filter server 304 for the last client offset that the filter server 304 has processed. In response, the filter server 304 may provide the client offset stored in the UserSession associated with the connection and the client keeps track of that value. The element change data is sent from the filter server 304 to a topic (e.g., "element-changes-up-{GUID}") of the message broker 306 corresponding to the virtual three-dimensional room 310, which the real time stream processor 308 reads and echoes to another topic (e.g., "element-changes-down-{GUID}"). The filter server 304 may read this echoed message and transmits the message to all users in the virtual three-dimension room 310 except for the user who generated the element change. The filter server 304 may add an additional field of metadata (the server offset) before sending this message to the clients. The server offset is the offset in the topic maintained by the message broker 306 that corresponds with the message. Clients may track this value for reconnection purposes. For instance, a client may be able to request messages beginning at a server offset on reconnection based on the offset of the last message received.

In an embodiment, if a user is temporarily disconnected from a virtual three-dimensional room 310, the reconnecting client of the user can send its previously assigned session identifier, server offset, and the name of the virtual three-dimensional room 310 to the filter server 304. The filter server 304 may verify that there was a UserSession with the provided session identifier which was previously in that room and initializes the message broker consumer to start reading from the provided server offset. This ensures that the client can read all messages that were sent from other users and/or from the room configuration recommendation system 312 while the client was disconnected from the room. Additionally, the filter server 304 sends a reconnection response which includes a value indicating whether the reconnection was successful, and the last client offset that the server had received before disconnection. The client buffers all messages it sends until the filter server 304 acknowledges a client offset greater than the message's offset. This allows the client to still have all the changes it made while disconnected. Further, this allows the client to send all messages that the client has generated with an offset larger than the last server-acknowledged client offset, thereby ensuring that no messages are lost.

The filter server 304 also provides multicast functionality of unreliable data (UDP). Unreliable data may be forwarded immediately to all other clients in a virtual three-dimensional room 310 without any added metadata from the filter server 304. Unreliable data that is missed while disconnected may not be re-sent. Additionally, UDP data may not be sent through the websocket, such that a different form of connection and authentication may be required. When a client successfully joins a virtual three-dimensional room, the filter server 304 may send a cookie verification message to the client through the websocket. The message may be a securely and randomly generated message that the client can only know because the filter server 304 sent the message. The client may be required to echo this message to the filter server 304 over UDP. When the filter server 304 receives a cookie verification packet, the filter server 304 confirms that it is a valid cookie that the filter server 304 had previously provided. The filter server 304 may echo this packet back to the client 316 to indicate that the client has been successfully authenticated. After the filter server 304 receives the valid cookie packet, the filter server 304 tracks the Internet Protocol (IP) address and port number that the packet came from and stores this information in the UserSession for the associated websocket connection. As a result, the client is eligible to send and receive UDP data.

In an embodiment, the filter server 304 is configured to support encryption of both reliable and unreliable data. The websocket encryption may be supported using Transport Layer Security (TLS) encryption protocols via server certificates. UDP encryption may be performed using Datagram TLS (DTLS) communications protocols, which may handle the handshake process with appropriate timeouts for lost packets. If encryption is enabled on the filter server 304, websocket connections may be required to connect securely over HyperText Transfer Protocol Secure (HTTPS) protocols such that non-secure connections are rejected. UDP encryption may be implemented on a per-client basis. For instance, when a user initially connects to the filter server 304 via websocket, the client sends a message indicating whether it wishes to use encrypted UDP traffic. The filter server 304 may track this configuration when sending the cookie verification packet when the user enters a room. When forwarding UDP packets to other users in a room, the filter server 304 may decrypt the packet and, on a per-client basis, re-encrypt or directly forward the message to other connected clients. Each encrypted connection may have a different encryption key that is negotiated in the DTLS handshake process.

In an embodiment, when the last user in a virtual three-dimensional room disconnects, the filter server 304 may terminate the room. This may cause all UserSessions associated with the room and the room itself to be deleted from the in-memory database of the filter server 304. Further, the filter server 304 may terminate the topics maintained by the message broker 306 specific to the room and sends a message via a "room-changes-up" topic to the real time stream processor 308 to indicate that it should close its consumer and producer for the room and destroy any state associated with the room snapshot. This may prevent a client from trying to reconnect to the room. Further, any requests to reconnect to the room are denied. The unique name for the room is subsequently made available for re-creation.

The real time stream processor 308 may be implemented using a computer system or application executed on a computer system of the collaborative virtual environment service 102. The real time stream processor 308 may perform two primary duties: assign session identifiers and track room states for the creation of room snapshots. As noted above, the real time stream processor 308 may be subscribed to a "user-joined-up" topic maintained by the message broker 306. When a message is received on this topic, the real time stream processor 308 may assign a session identifier to the corresponding user and send the session identifier to a "user-joined-down" topic maintained by the message broker 306. Further, when a room request is received on the "room-changes-up" topic maintained by the message broker 306, the real time stream processor 308 may attach a producer and consumer to the topics specified in the message. The consumer may read all element changes and forwards these unchanged to the producer. In addition to forwarding the message, the message is processed using the same library that the client uses to track and receive element changes.

A virtual three-dimensional room 310 may be represented in a tree with a root being defined by a room element. All element changes made within a virtual three-dimensional room 310 may result in modifications to this tree. The tree may be serialized into a JSON payload. When a user joins a virtual three-dimensional room 310, the real time stream processor 308 may serialize the state of the room at that time, resulting in a room snapshot. The real time stream processor 308 may transmit the room snapshot with a server offset from which the room snapshot was created. This may enable the client to begin loading the element data near to the current state of the virtual three-dimensional room 310. The client may send a request to the filter server 304 to start at the server offset that was specified in the room snapshot, thus skipping numerous messages in order to join the virtual three-dimensional room 310 quickly. If the client encounters an issue loading the room snapshot, the client can request to start at a null offset and process every change made to the virtual three-dimensional room from its inception. This may occur if the client and server versions of the virtual three-dimensional room are different and the client is unable to deserialize the room snapshot due to this incompatibility.

In an embodiment, the real time stream processor 308 may perform windowed message aggregation to compress duplicate element changes made over a short period of time. For instance, if an element's position is changed a number of times within a short period of time (e.g., 10 milliseconds, etc.), the real time stream processor 308 may relay the final position to other clients by compressing these changes into one.

In an embodiment, the real time stream processor 308 supports permanently saving virtual three-dimensional room states to disk or database at set intervals. This may allow the full message broker topic to be cleared, especially when no one is active in the virtual three-dimensional room 310. Further, this may allow for the recreation of the virtual three-dimensional room 310 from its previous state at any time. This may also be used as a backup if important data within a virtual three-dimensional room 310 is deleted. Through the use of these states, a virtual three-dimensional room 310 may be fast-forwarded or rewound, allowing for replay of important user interactions at any time. In some instances, virtual three-dimensional room states may be provided to the room configuration recommendation system 312, which may process these virtual three-dimensional room states to obtain historical user interactions within the different virtual three-dimensional rooms with different data elements and other users. This historical data may be used to further supplement the dataset maintained by the room configuration recommendation system 312 for dynamically training the machine learning algorithm or artificial intelligence implemented for generating real-time data source and room configuration recommendations.

The message broker 306 may be implemented as an application implemented on a computer system of the collaborative virtual environment service 102. The message broker 306 may be implemented using Apache Kafka®, which may utilize Apache Zookeeper™ to store metadata about topics and other connected brokers. The message broker 306 may be a key component in allowing concurrent reads and writes from multiple clients and the room configuration recommendation system 312, and in allowing client reconnection. The message broker 306 may comprise topics, which are unbounded arrays of key-value pairs. The keys of these key-value pairs may be client identifiers and the corresponding values may be the message contents. Messages may be persisted to disk by the message broker 306 before informing any consumers of new messages.

Interaction with the message broker 306 may be performed using producers and consumers. Producers may generate messages for a particular topic and consumers may read messages from a topic. Messages may not be consumed when read. Instead, each consumer tracks its offset in the topic individually and the offset is advanced for each message read. This may allow consumers to begin reading messages at any place in the topic, which is used both for room snapshots and client reconnection. When a producer's message is written to disk, all consumers are informed of the new message and begin processing this message. The message broker 306 may guarantee "exactly-one" delivery, so that consumers receive all messages and that no messages are duplicated.

The message broker 306 may also allow for horizontal scaling. For instance, the collaborative virtual environment service 102 may create additional message broker instances, with the topics synced between instances, in order to meet client and room demands. This may provide load balancing when numerous users are connected to a single server instance. The message broker 306 may automatically sync topics across broker instances such that all produced messages are available to a consumer connected to any of the broker instances.

Figure 4:
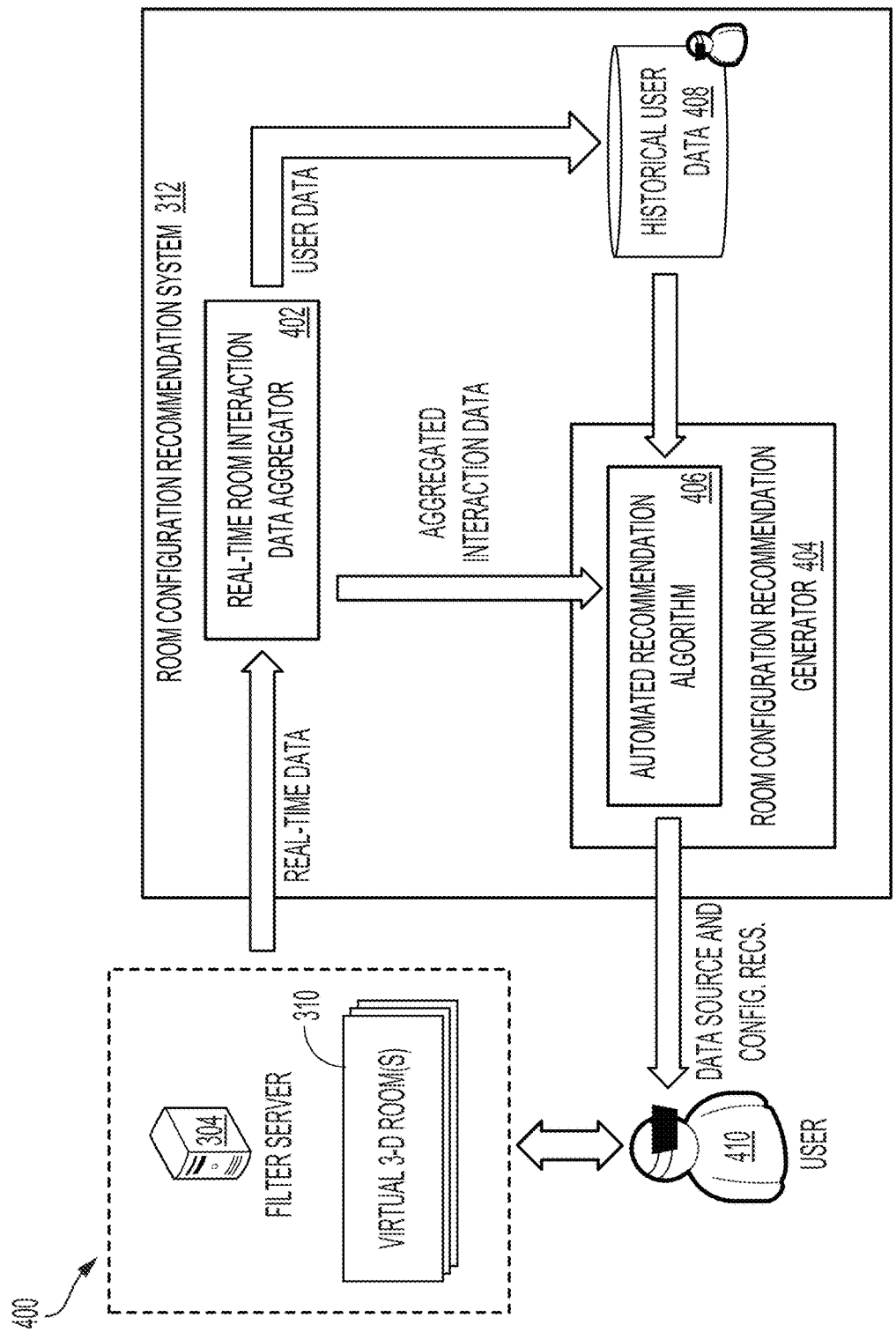
FIG. 4 shows an illustrative example of an environment in which a room configuration recommendation system processes, in real-time, data associated with active virtual three-dimensional rooms to generate data source and room configuration recommendations in accordance with at least one embodiment.

FIG. 4 shows an illustrative example of an environment 400 in which a room configuration recommendation system 312 processes, in real-time, data associated with active virtual three-dimensional rooms 310 to generate data source and room configuration recommendations in accordance with at least one embodiment. In the environment 400, the room configuration recommendation system 312, through a real-time room interaction data aggregator 402, may obtain, in real-time, data from the filter server 304 and the myriad virtual three-dimensional rooms 310 as users interact with the various data elements implemented in these virtual three-dimensional rooms 310 and with one another. The real-time room interaction data aggregator 402 may be implemented on a computer system or other system (e.g., server, virtual machine instance, special-purpose computing device, etc.) of the room configuration recommendation system 312. Alternatively, the real-time room interaction data aggregator 402 may be implemented as an application or other process executed on a computing system of the room configuration recommendation system 312.

In an embodiment, the real-time room interaction data aggregator 402 monitors, in real-time, any messages exchanged by the filter server 304 (such as with the message broker 306 described above in connection with FIG. 3 and with various users) corresponding to element changes being propagated to different data elements within the myriad virtual three-dimensional rooms 310. For instance, the real-time room interaction data aggregator 402 may maintain a real-time data stream or feed with the filter server 304 to automatically obtain any new element changes written to the "element-changed-up-{GUID}" topic maintained by the message broker and corresponding to any of the myriad virtual three-dimensional rooms 310 implemented by the collaborative virtual environment service. In some instances, the real-time room interaction data aggregator 402 may automatically, and in real-time, pull these new element changes written to the "element-changed-up-{GUID}" topic maintained by the message broker. Additionally, or alternatively, the filter server 304 may automatically, and in real-time, push any newly received element changes that are to be written to the "element-changed-up-{GUID}" topic maintained by the message broker as these new element changes are received.

In some instances, the real-time room interaction data aggregator 402 may further monitor, in real-time, any echoed messages from the RSP that are to be propagated to other users within the myriad virtual three-dimensional rooms 310 to propagate any new element changes made to data elements within these virtual three-dimensional rooms 310. As noted above, element change data is sent from the filter server 304 to a topic (e.g., "element-changes-up-{GUID}) of the message broker corresponding to the virtual three-dimensional room 310 associated with the data element for which the element change is being implemented. The RSP may read and echo this element change data to another topic (e.g., "element-changes-down-{GUID}). The filter server 304 may read this echoed message and transmits the message to all users in the virtual three-dimension room 310 except for the user who generated the element change. The real-time room interaction data aggregator 402 may also receive this echoed message in real-time for aggregation. In some instances, the real-time room interaction data aggregator 402 may automatically, and in real-time, pull the echoed message from the filter server 304. Additionally, or alternatively, the filter server 304 may automatically, and in real-time, push any newly received echoed messages to the real-time room interaction data aggregator 402.

In an embodiment, the real-time room interaction data aggregator 402 aggregates these messages according to different criteria. For instance, the real-time room interaction data aggregator 402 may aggregate the interaction data, in real-time, according to each user. For instance, if a user, within one or more virtual three-dimensional rooms 310, interacts with one or more data elements (resulting in element changes to be propagated by the filter server 304, etc.), the real-time room interaction data aggregator 402 may, in real-time, aggregate and associate these interactions with the particular user. This user-specific data may be stored in a historical user datastore 408, which may provide user entries that may be used to maintain a historical record of user interactions with different data elements, different users, and different virtual three-dimensional rooms 310. Further, the real-time room interaction data aggregator 402 may aggregate the interaction data, in real-time, according to the virtual three-dimensional room 310 from which the interaction data was obtained. For instance, as the filter server 304 obtains element change data from different users associated with a particular virtual three-dimensional room, the real-time room interaction data aggregator 402 may, in real-time, aggregate this element change data as the element change data is obtained to generate an aggregated record of the real-time element changes within the virtual three-dimensional room.

In an embodiment, the real-time room interaction data aggregator 402 further obtains, in real-time, any data corresponding to user interactions with other users within the myriad virtual three-dimensional rooms 310. For instance, the real-time room interaction data aggregator 402 may aggregate any communications amongst users within different active virtual three-dimensional rooms 310 as these communications are exchanged through different active communications sessions. The real-time room interaction data aggregator 402, in an embodiment, actively monitors any communications sessions established amongst users within the different virtual three-dimensional rooms 310 to obtain, in real-time, any communications exchanged amongst these users as these communications are exchanged. The real-time room interaction data aggregator 402 may aggregate these communications according to their corresponding communications sessions, the users engaged in these communications sessions, and the virtual three-dimensional rooms 310 within which these communications sessions are implemented. The real-time room interaction data aggregator 402 may further record these communications in the historical user datastore 408 according to the users that exchanged these communications through the active communications sessions.

As the real-time room interaction data aggregator 402 aggregates, in real-time, the interaction data from the filter server 304 and the one or more virtual three-dimensional rooms 310, the real-time room interaction data aggregator 402 may provide, in real-time, the aggregated interaction data to a room configuration recommendation generator 404 for generation of one or more data source and room configuration recommendations. The room configuration recommendation generator 404 may be implemented on a computer system or other system (e.g., server, virtual machine instance, special-purpose computing device, etc.) of the room configuration recommendation system 312. Alternatively, the room configuration recommendation generator 404 may be implemented as an application or other process executed on a computing system of the room configuration recommendation system 312.

In an embodiment, to generate new data source and room configuration recommendations for users, including user 410, the room configuration recommendation generator 404 dynamically trains, in real-time, an automated recommendation algorithm 406. The automated recommendation algorithm 406 may be dynamically trained, in real-time, using supervised training techniques. For instance, a dataset of virtual three-dimensional room configurations for a sample set of virtual three-dimensional rooms (e.g., a subset of virtual three-dimensional rooms 310, a set of test or hypothetical virtual three-dimensional rooms, etc.), events associated with users within this sample set of virtual three-dimensional rooms, and user characteristics (e.g., demographics, occupation, role, etc.), and known trends may be selected for training of the automated recommendation algorithm 406. The known trends used to train the automated recommendation algorithm 406 may include correlations between the types of users and virtual three-dimensional rooms with the types of data elements introduced or interacted with within these virtual three-dimensional rooms. Further, these correlations may correspond to user behaviors resulting from the introduction and/or presence of different data elements within these virtual three-dimensional rooms for different virtual three-dimensional room types.

In an embodiment, to dynamically train the automated recommendation algorithm 406 to generate new data source and room configuration recommendations for users, the room configuration recommendation generator 404 may initialize, for the automated recommendation algorithm 406, a set of coefficients randomly according to a normal probability distribution to generate an initial iteration of the automated recommendation algorithm 406. The room configuration recommendation generator 404 may use this initial iteration of the automated recommendation algorithm 406 to process the aforementioned dataset to generate an output. This output may include different sample recommendations for different data sources and/or room configurations for each of the data points within the dataset. The configuration recommendation generator 404 may compare this output to the sample trends (e.g., known trends) and recommendations (e.g., expected recommendations) defined in the dataset for each data point to identify any inaccuracies or other errors. The magnitude of these inaccuracies or other errors may be evaluated to determine whether the automated recommendation algorithm 406 satisfies one or more pre-defined criteria implemented by the room configuration recommendation generator 404.

In an embodiment, the room configuration recommendation system 312 can evaluate the automated recommendation algorithm 406 to determine, based on the input sample dataset, whether the automated recommendation algorithm 406 is identifying an accurate set of trends and generating accurate data resource and/or virtual three-dimensional room configuration recommendations based on this set of trends. For example, if the sample dataset corresponds to a set of virtual three-dimensional rooms implemented to provide an educational environment for a set of students and educators, and these students and educators actively interact with a data element corresponding to a mathematical application and associated data, the automated recommendation algorithm 406 may be evaluated to determine whether the automated recommendation algorithm 406 accurately identified the particular data element as being pertinent or desirable for these types of users and virtual three-dimensional rooms (e.g., students/educators and educational environment, respectively). If the automated recommendation algorithm 406 outputs a recommendation corresponding to the introduction of a data element corresponding to a live video feed of a road intersection, an evaluator of the automated recommendation algorithm 406 may determine that the recommendation does not comport with the expected recommendation for such virtual three-dimensional rooms and/or users. Accordingly, the evaluator may re-train the automated recommendation algorithm 406 by adding annotations to the recommendation, indicating the appropriate recommendation that should have been presented based on the sample dataset.

If the room configuration recommendation generator 404 determines that the automated recommendation algorithm 406 does not satisfy the one or more pre-defined criteria, the room configuration recommendation generator 404 may iteratively update one or more coefficients of the set of coefficients to dynamically update the automated recommendation algorithm 406. The updated automated recommendation algorithm 406 may be used to process the aforementioned dataset, as well as any additional data points or datasets obtained by the room configuration recommendation generator 404 (such as through evaluation of any newly generated virtual three-dimensional rooms and identification of any new trends, etc.), to generate a new output. In some instances, the room configuration recommendation generator 404 may use an optimization algorithm to iteratively update one or more coefficients of the set of coefficients. For instance, the room configuration recommendation generator 404 may use gradient descent to update the logistic coefficients of the automated recommendation algorithm 406 to enable generation of new values that may be used to generate recommendations based on the data points of the previously evaluated dataset and of any new data points obtained by the room configuration recommendation generator 404. The room configuration recommendation generator 404 may use this updated automated recommendation algorithm 406 to process the available data points and generate a new output. The room configuration recommendation generator 404 may evaluate this new output to determine whether the output satisfies the one or more criteria. This process of updating the set of coefficients associated with the automated recommendation algorithm 406 according to the one or more criteria may be performed iteratively until an updated automated recommendation algorithm 406 is produced that satisfies the one or more criteria.

As noted above, the aggregated interaction data may include communications and messages exchanged between different users within the myriad virtual three-dimensional rooms 310. To process these communications and messages, the automated recommendation algorithm 406 may include one or more NLP algorithms that may automatically process any communications amongst users within different active virtual three-dimensional rooms 310 to determine user behaviors within these virtual three-dimensional rooms. Through the one or more NLP algorithms, the automated recommendation algorithm 406 may identify any intents associated with users engaged in a communications session with a virtual three-dimensional room. An intent may correspond to an issue that a user wishes to have resolved. Examples of intents can include (for example) a topic, sentiment, complexity, and urgency. A topic can include, but is not limited to, a subject, a product, a service, a technical issue, a use question, a complaint, a request, etc. An intent can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency). Based on any identified intents, the automated recommendation algorithm 406 may determine corresponding user behaviors that may be used to identify possible data source and room configuration recommendations that may be provided to these users.

In an embodiment, the automated recommendation algorithm 406 can be further dynamically trained using unsupervised training techniques. For instance, the aforementioned dataset may be analyzed using a clustering algorithm to identify different data elements and sources that may be closely correlated to particular types of users and/or virtual three-dimensional rooms (e.g., clusters). In some embodiments, the sample dataset can be analyzed to identify correlations between different types of users and their behaviors, the different types of virtual three-dimensional rooms, and the types of data elements or sources included therein.

In an embodiment, the automated recommendation algorithm 406 automatically processes the aggregated interaction data and historical user data (from the historical user datastore 408) corresponding to the users associated with the aggregated interaction data to generate one or more data source and room configuration recommendations that may be provided to different users, including user 410. As an illustrative example, if user 410 submits a request to create a new virtual three-dimensional room, the room configuration recommendation system 312 may identify one or more user characteristics associated with the user 410. For instance, the room configuration recommendation system 312 may access, from the historical user datastore 408, data corresponding to the user account associated with the user 410. This data may indicate any roles assigned to the user 410. In addition to identifying any roles associated with the user 410, the room configuration recommendation system 312 may evaluate the user account associated with the user 410 from the historical user datastore 408 to identify any other user characteristics that may be used to determine what data elements, data sources, and room configurations may be recommended to the user 410 in response to their request. In some instances, in response to the request to create a new virtual three-dimensional room, the room configuration recommendation system 312 may prompt the user 410 to provide additional information regarding the purpose of the new virtual three-dimensional room.

The obtained data associated with the user 410 may be used as input to the automated recommendation algorithm 406 to generate a tailored set of data source and room configuration recommendations that may be provided to the user 410. Returning to an earlier illustrative example, if the user 410 is a dispatcher associated with an emergency services team at a particular location, the automated recommendation algorithm 406 may identify one or more data sources corresponding to the particular location and that may be relevant to the user's role as a dispatcher at the particular location. Further, the automated recommendation algorithm 406 may recommend a particular virtual three-dimensional room configuration that may be conducive to the user 410 in performing their role as a dispatcher for the emergency services team at the particular location. For instance, if other members of the emergency services team maintain different virtual three-dimensional rooms for managing pertinent emergencies, the automated recommendation algorithm 406 may generate a recommendation corresponding to one or more of the different data sources and elements implemented in these different virtual three-dimensional rooms, as well as any room configurations that may be best suited for the user's role as a dispatcher associated with the emergency services team.

In an embodiment, the room configuration recommendation generator 404 monitors user interaction with the one or more provided recommendations to obtain, in real-time, feedback corresponding to the provided recommendations. For example, if the room configuration recommendation generator 404 presents, through a panel within a new virtual three-dimensional room, a recommendation to introduce a particular set of data elements, but the user 410 opts to reject the recommendation (e.g., the user 410 dismisses the panel, the user 410 selects an option to reject the recommendation through the panel, etc.), the room configuration recommendation generator 404 may use this rejection of the recommendation as user feedback that may be used to dynamically retrain or otherwise update the automated recommendation algorithm 406 such that, for similar users and/or virtual three-dimensional rooms, the likelihood of this particular set of data elements being recommended to these similar users and/or for similar virtual three-dimensional rooms is reduced. However, if the user 410 accepts a particular data source and room configuration recommendation, the collaborative virtual environment service can implement the recommended data sources and/or room configurations within the new virtual three-dimensional room. Further, the user's acceptance of the presented recommendation may be used as feedback that may be used to dynamically reinforce or otherwise update the automated recommendation algorithm 406 such that, for similar users and/or virtual three-dimensional rooms, the particular set of data elements being recommended to these similar users and/or for similar virtual three-dimensional rooms is maintained or increased.

In an embodiment, as users interact with the myriad recommendations generated by the automated recommendation algorithm 406 provided to these users, the room configuration recommendation generator 404 may collect, in real-time, user behavior and room utilization data corresponding to the virtual three-dimensional rooms that the users may be engaged with. This user behavior and room utilization data may be evaluated by the room configuration recommendation generator 404 and used to generate new data points that may be used to dynamically, and in real-time, update the automated recommendation algorithm 406 implemented by the room configuration recommendation generator 404 to generate data source and room configuration recommendations. Thus, as virtual three-dimensional rooms are implemented and used by various users associated with the collaborative virtual environment service, the room configuration recommendation generator 404 may dynamically obtain, in real-time, user behavior and room utilization data corresponding to these myriad virtual three-dimensional rooms and to these myriad users as these users interact with different data elements within these myriad virtual three-dimensional rooms and communicate amongst themselves within these virtual three-dimensional rooms and/or through these data elements. The voluminous amount of data may be dynamically processed, in real-time and as this data is obtained, by the room configuration recommendation generator 404 to dynamically, and in real-time, update the automated recommendation algorithm 406. This may enable the machine learning algorithm or artificial intelligence to dynamically provide more accurate recommendations to users within their respective virtual three-dimensional rooms in real-time.

In addition to providing data source and room configuration recommendations to users requesting implementation of new virtual three-dimensional rooms, the automated recommendation algorithm 406 can generate, in real-time, recommendations that may be provided to other users participating in existing virtual three-dimensional rooms. For example, if user 410 is a participant in an existing virtual three-dimensional room, the user's behavior (e.g., user interactions with the one or more data elements, user communications with other users, etc.) and the room utilization data corresponding to the virtual three-dimensional room the user 410 is a participant in may be processed, in real-time, by the automated recommendation algorithm 406 to generate new data source and room configuration recommendations that may be presented to the user 410 within the virtual three-dimensional room. As an illustrative example, if the user 410 interacts with a particular set of data elements within a virtual three-dimensional room and has a similar role to that of other users within another virtual three-dimensional room, the automated recommendation algorithm 406 may determine that the data elements used by these other users within the other virtual three-dimensional room should be recommended to the user 410 since the user 410 shares a similar role with these other users and these other users are routinely interacting with the identified data elements within the other virtual three-dimensional room.

The room configuration recommendation generator 404 may present the newly generated recommendations to the user 410 within the existing virtual three-dimensional room that the user 410 is a participant in. Within the virtual three-dimensional room, the user 410 may determine whether to accept or reject the provided recommendations. For example, if the room configuration recommendation generator 404 presents, through a panel within the existing virtual three-dimensional room, a recommendation to introduce a particular set of data elements into the virtual three-dimensional room, but the user 410 opts to reject the recommendation, the room configuration recommendation generator 404 may use this rejection of the recommendation as user feedback that may be used to dynamically retrain or otherwise update the automated recommendation algorithm 406 such that, for similar users and/or virtual three-dimensional rooms, the likelihood of this particular set of data elements being recommended to these similar users and/or for similar virtual three-dimensional rooms is reduced. Alternatively, if the user 410 opts to accept the recommendation, and the particular set of data elements are introduced into the existing virtual three-dimensional room, the room configuration recommendation generator 404 may use this feedback to dynamically reinforce or otherwise update the machine learning algorithm or artificial intelligence such that, for similar users and/or virtual three-dimensional rooms, the likelihood of this particular set of data elements being recommended to these similar users and/or for similar virtual three-dimensional rooms is maintained or increased.

In an embodiment, for an existing virtual three-dimensional room including myriad users interacting with various data elements within the existing virtual three-dimensional room, the automated recommendation algorithm 406 may generate a recommendation that may be provided to these myriad users within the virtual three-dimensional room. This recommendation may be generated based on their collective user behaviors and characteristics. A recommendation for a particular data element and/or room configuration provided to multiple users within a virtual three-dimensional room can be subject to one or more acceptance criteria such that, if these one or more acceptance criteria are not satisfied, the recommendation is deemed to be rejected by the multiple users. For example, if the room configuration recommendation generator 404 presents a recommendation to a set of users within an existing virtual three-dimensional room for introduction of one or more data elements, the room configuration recommendation generator 404 may require that a quorum of this set of users approve of the recommendation in order for the one or more data elements to be added to the virtual three-dimensional room. As another example, if the room configuration recommendation generator 404 presents a recommendation to this set of users for introduction of the aforementioned one or more data elements, the room configuration recommendation generator 404 may require a simple majority of this set of users to approve of the recommendation in order for the one or more data elements to be added to the virtual three-dimensional room. Other acceptance criteria may indicate a minimum number of users required for acceptance of a recommendation, a required number of responses to the recommendation within a pre-defined period of time, a requirement that all users agree to the recommendation, and the like.

In an embodiment, the automated recommendation algorithm 406 is dynamically trained, in real-time, to leverage one or more foundation models to dynamically, and in real-time, generate one or more recommendations for augmentations and/or enhancements to the virtual three-dimensional room. For example, the automated recommendation algorithm 406 may automatically process the aggregated interaction data associated with the virtual three-dimensional room to construct a dynamic query that may be submitted to the one or more foundation models for creation of the one or more recommendations. For instance, as users within the virtual three-dimensional room interact with different data elements within the virtual three-dimensional room and interact with one another, the automated recommendation algorithm 406 may automatically process these interactions in real-time to generate a natural language query corresponding to these interactions. As an illustrative example, if users within a virtual three-dimensional room are actively engaged with different data elements and in conversations related to security issues in a metropolitan area, the automated recommendation algorithm 406 may dynamically process these interactions to generate the dynamic query "Show me data elements only for security issues related to the metropolitan area." The dynamic query may include one or more keywords or anchors corresponding to these interactions. For instance, the dynamic query "Show me data elements only for security issues related to the metropolitan area" may include the keywords and anchors "data elements," "only for security issues," and "metropolitan area." This may inform the one or more foundation models that they are to produce an output that includes data elements associated with data sources corresponding to any security issues within the metropolitan area.

As noted above, a foundation model is a large machine learning model or artificial intelligence model that is dynamically trained using a large or broad dataset comprising unlabeled data to automatically perform a wide range of functions. The foundation model may rely on SSL techniques, whereby the dataset used to train the foundation model is unlabeled or unstructured such that the foundation model may automatically generate labels for the data included in the dataset through the identification of complex patterns from the unlabeled dataset. These automatically generated labels may be used by the foundation model in subsequent iterations as ground truths that can be used to further train the foundation model. The one or more foundation models may be dynamically trained and maintained by the room configuration recommendation generator 404. Alternatively, the one or more foundation models may be dynamically trained and maintained by a third-party entity, which may dynamically train the one or more foundation models using real-time data from the collaborative virtual environment service and myriad other data sources (e.g., public data sources, private data sources, etc.).

In response to the natural language query generated by the automated recommendation algorithm 406 based on the aggregated interaction data associated with the virtual three-dimensional room, the one or more foundation models may automatically generate, in real-time, one or more options for augmenting or enhancing the current virtual three-dimensional room according to the aggregated interaction data. These one or more options may be automatically obtained by the room configuration recommendation generator 404, which may automatically present these options to the users within the virtual three-dimensional room. For example, the room configuration recommendation generator 404 may automatically generate and send one or more element changes to the filter server 304 to introduce these options to the users within the virtual three-dimensional room, as described above. These options may be presented through new data elements within the virtual three-dimensional room. For instance, the room configuration recommendation generator 404 may introduce one or more panels through which these options may be presented to the users within the virtual three-dimensional room. In an embodiment, if the one or more options generated by the one or more foundation models correspond to modifications of existing data elements implemented in the virtual three-dimensional room, the room configuration recommendation generator 404 may automatically provide the data element changes corresponding to these options to the filter server 304, which may write these one or more element changes to the "element-changes-up-{GUID}" topic described above. This may result in the affected data elements to be modified in real-time to present these options to the users. Through these affected data elements, users may be able to determine whether to accept any of the presented options, which may result in these data elements being modified to incorporate the selected options (e.g., new data sources, changes to existing data sources, etc.).

As noted above, the one or more foundation models may provide one or more options for creating new virtual three-dimensional rooms that incorporate different data elements based on the submitted query. For instance, in response to a dynamic query from the automated recommendation algorithm 406, the one or more foundation models may return one or more possible virtual three-dimensional room configurations and corresponding data sources and elements that may be used to dynamically construct new virtual three-dimensional rooms. The room configuration recommendation generator 404 may use these configurations and corresponding data sources and elements to dynamically generate one or more options for different virtual three-dimensional rooms that may be instantiated upon selection by the users associated with the current virtual three-dimensional room. In some instances, these options may be presented within a virtual three-dimensional environment for each user (e.g., user 410, etc.) for which the options were generated. For instance, within a user's virtual three-dimensional environment, the room configuration recommendation generator 404 may instantiate one or more new virtual three-dimensional rooms according to the obtained configurations and corresponding data sources. The user 410 associated with this virtual three-dimensional environment may be able to explore these different virtual three-dimensional rooms to determine which of these virtual three-dimensional rooms the user 410 would like to maintain for their use. In some instances, the user 410 may select different data elements from these recommended virtual three-dimensional rooms to construct their own custom virtual three-dimensional room.

In some instances, the one or more foundation models may indicate that the virtual three-dimensional room may be merged with another active virtual three-dimensional room based on the submitted query. This other active virtual three-dimensional room, for instance, may implement different or similar data elements that may be of interest to the users associated with the original virtual three-dimensional room. The one or more foundation models may provide, to the room configuration recommendation generator 404, a unique identifier or other information associated with the other active virtual three-dimensional room that may be merged with the original virtual three-dimensional room. Accordingly, the room configuration recommendation generator 404 may automatically update the original virtual three-dimensional room (such as through the filter server 304 according to the process described above) to present the users associated with this virtual three-dimensional room with an indication of this other active virtual three-dimensional room (e.g., data elements implemented in the other active virtual three-dimensional room, information corresponding to the purpose of the other active virtual three-dimensional room, etc.) as well as a prompt to determine whether to proceed with the merger of the virtual three-dimensional rooms. As noted above, approval of the merger of the two virtual three-dimensional rooms may be subject to one or more criteria (e.g., quorum, simple majority, minimum number of user required to approve the merger, etc.). If the merger is approved according to any applicable criteria, these virtual three-dimensional rooms may be automatically merged. Through this merged virtual three-dimensional room, users may interact with the other users associated with the other active virtual three-dimensional room subject to any rules or permissions and user roles. Further, these users may interact with the data elements in the merged virtual three-dimensional room subject to any applicable rules or permissions and user roles.

In some instances, the one or more foundation models may be subscribed to the one or more topics on the message broker to automatically obtain, in real-time, interaction data associated with the virtual three-dimensional room. Through this interaction data, the one or more foundation models may automatically detect any events within the virtual three-dimensional room for which different augmentations and/or enhancements to the virtual three-dimensional room may be recommended or otherwise provided to users within the virtual three-dimensional room. For example, if the one or more foundation models determine, based on real-time interaction data associated with the virtual three-dimensional room, that users are engaged in a discussion related to security issues in London, the one or more foundation models may automatically identify any data sources and/or data elements that may be recommended to the users within the virtual three-dimensional room and that may be relevant to their discussion about security issues in London (e.g., video feeds corresponding to locations where security issues are elevated, databases including documentation regarding security issues in London, etc.). In some instances, the one or more foundation models may automatically present these recommendations to users within the virtual three-dimensional room through the filter server 304 according to the process described above for implementing dynamic changes to data elements within a virtual three-dimensional room.

Figure 5:
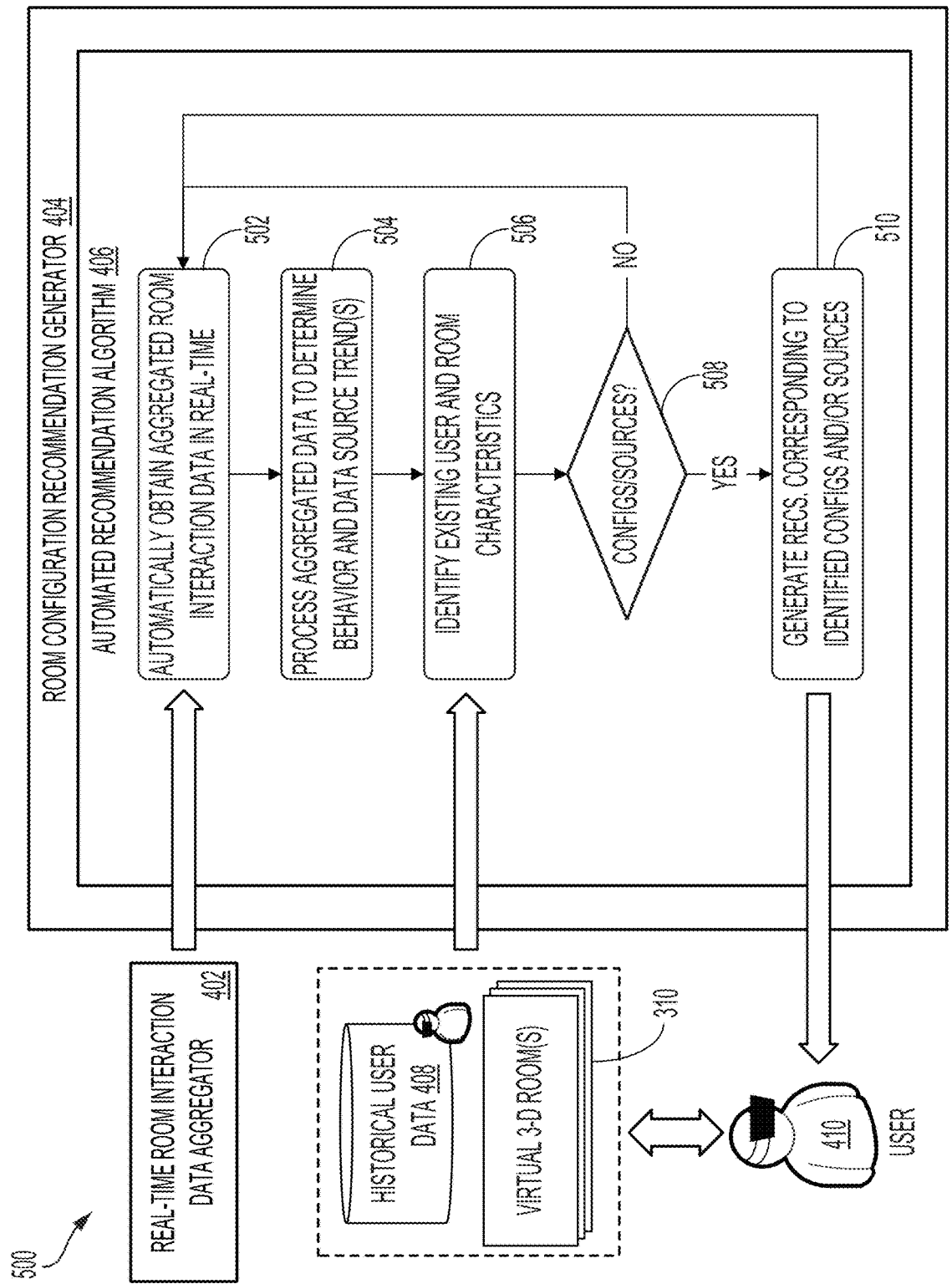
FIG. 5 shows an illustrative example of an environment in which an automated recommendation algorithm automatically generates, in real-time, recommendations corresponding to data sources and/or room configurations for new or existing virtual three-dimensional rooms in accordance with at least one embodiment.

FIG. 5 shows an illustrative example of an environment 500 in which an automated recommendation algorithm 406 automatically generates, in real-time, recommendations corresponding to data sources and/or room configurations for new or existing virtual three-dimensional rooms in accordance with at least one embodiment. As noted above, a user 410 may submit a request to the collaborative virtual environment service to create a new virtual three-dimensional room through which the user 410 may interact with different data elements and other users permitted to access the new virtual three-dimensional environment. In response to the request, the collaborative virtual environment service may identify one or more user characteristics associated with the user 410, as well as determine the purpose of the new virtual three-dimensional environment. This data may be used to generate one or more recommendations specifying data sources and room configurations that may be implemented in the new virtual three-dimensional room. In addition to providing recommendations to users in response their requests to generate new virtual three-dimensional rooms, the collaborative virtual environment service may evaluate user behaviors and interactions within an existing virtual three-dimensional room to generate recommendations for data elements and/or room configurations that may be implemented within the existing virtual three-dimensional room.

In the environment 500, to generate these one or more recommendations, the automated recommendation algorithm 406 implemented by the room configuration recommendation generator 404 may, at step 502, automatically obtain aggregated room interaction data from the real-time room interaction data aggregator 402. As noted above, the real-time room interaction data aggregator 402 aggregates interaction data, in real-time, according to each user within the various virtual three-dimensional rooms 310 implemented by the collaborative virtual environment service. For instance, if a user, within one or more virtual three-dimensional rooms 310, interacts with one or more data elements, the real-time room interaction data aggregator 402 may, in real-time, aggregate and associate these interactions with the particular user. This user-specific data may be stored in a historical user datastore 408. Further, the real-time room interaction data aggregator 402 may aggregate the interaction data, in real-time, according to the virtual three-dimensional room 310 from which the interaction data was obtained to generate an aggregated record of the real-time element changes within the virtual three-dimensional room. The real-time room interaction data aggregator 402 may further aggregate any communications amongst users within different active virtual three-dimensional rooms 310 as these communications are exchanged through different active communications sessions. As the real-time room interaction data aggregator 402 aggregates, in real-time, the interaction data, the real-time room interaction data aggregator 402 may provide, in real-time, the aggregated interaction data to the automated recommendation algorithm 406.

At step 504, the automated recommendation algorithm 406 may process the aggregated data to determine any user behavior and data source trends that may be used to generate a set of recommendations for users associated with new and existing virtual three-dimensional rooms 310. For instance, if the aggregated data corresponding to a particular virtual three-dimensional room indicates that users having an assigned role of "student" are actively interacting with a video element corresponding to a demonstration of aerodynamic principles, and another user having an assigned role of "faculty" is actively interacting with these other users to provide an explanation of the principles described through the video element, the automated recommendation algorithm 406 may determine that the virtual three-dimensional room likely provides an educational environment for these users. Further, for users having the role of "student," these users may be more likely to interact with the video element corresponding to the demonstration of aerodynamic principles. For the user having the assigned role of "faculty," the automated recommendation algorithm 406 may determine that they are likely to communicate with other users with regard to the video element. Thus, for this particular type of virtual three-dimensional room, users having similar roles may be more likely to interact or introduce similar video elements, subject to the nature of the educational environment.

In an embodiment, the aggregated data is processed for each user and for each virtual three-dimensional room 310 in order to determine myriad, real-time, user behavior and data source trends for each user and for each virtual three-dimensional room 310. This processing may be performed simultaneously for all users and virtual three-dimensional rooms 310 in real-time as the aggregated data corresponding to these users and virtual three-dimensional rooms 310 is obtained. Further, the automated recommendation algorithm 406 may process these user behaviors and data source trends to identify any correlations amongst different users and virtual three-dimensional rooms 310 in real-time. These correlations may be used by the automated recommendation algorithm 406 to dynamically generate recommendations that may be provided to different users, including user 410, associated with the collaborate virtual environment service.

At step 506, the automated recommendation algorithm 406 may identify the existing user and room characteristics for each user associated with the collaborative virtual environment service and for each virtual three-dimensional room implemented by the collaborative virtual environment service, respectively. For instance, the automated recommendation algorithm 406 may automatically obtain, from the historical user datastore 408, historical data corresponding to user interactions within the myriad virtual three-dimensional rooms implemented by the collaborative virtual environment service. This historical data may be obtained for each user associated with the collaborative virtual environment service and for each of the virtual three-dimensional rooms 310 these users may be engaged in. The historical user characteristics may include user demographics, occupations, assigned roles, and the like. The existing room characteristics may include, for each virtual three-dimensional room, a room type (e.g., educational, law enforcement, emergency services, etc.) and the types of data elements included within the virtual three-dimensional room.

At step 508, the automated recommendation algorithm may evaluate the identified user behavior and data source trends for each user and virtual three-dimensional room to determine whether any new data sources and/or room configurations may be recommended. For example, if the automated recommendation algorithm 406 determines, based on the identified existing user and room characteristics and determined user behavior and data source trends, that a particular user already has access to a particular set of data elements implemented in an existing virtual three-dimensional room and that comport with the determined user behavior and data source trends, the automated recommendation algorithm 406 may determine that no new recommendations need to be presented to the user. As another illustrative example, if a particular virtual three-dimensional room implements a set of data elements that comport with the identified user behavior and data source trends for similar virtual three-dimensional rooms, the automated recommendation algorithm 406 may determine that no new recommendations need to be presented to users associated with this virtual three-dimensional room, although recommendations may still be provided to any of these users based on their interactions in other virtual three-dimensional rooms, as applicable.

If the automated recommendation algorithm determines that no new recommendations need to be presented to users associated with a particular virtual three-dimensional room, the automated recommendation algorithm 406 may continue to automatically obtain and process new aggregated room interaction data from the real-time room interaction data aggregator 402 in real-time. This continuous and real-time processing of aggregated room interaction data as this data is received may cause the automated recommendation algorithm 406 to continuously, and in real-time, evaluate user interactions within the various virtual three-dimensional rooms 310 to provide timely recommendations for new data sources and/or room configurations that may be implemented in these various three-dimensional rooms 310. Thus, if the automated recommendation algorithm determines that no new recommendations need to be presented to users associated with a particular virtual three-dimensional room, the automated recommendation algorithm may continue, in real-time, to evaluate new aggregated interaction data as it is received in order to provide recommendations for new data sources and/or room configurations for this particular virtual three-dimensional room as needed.

In an embodiment, if the automated recommendation algorithm 406 determines that new data sources and/or recommendations may be recommended to one or more users associated with a particular virtual three-dimensional room, the automated recommendation algorithm 406, at step 510, may generate these recommendations for dissemination to the one or more users. As noted above, the room configuration recommendation generator 404 may monitor user interactions with the one or more provided recommendations to obtain, in real-time, feedback corresponding to the provided recommendations. This feedback may be used to dynamically, and in real-time, re-train, reinforce, or otherwise update the automated recommendation algorithm 406 to improve the likelihood of the automated recommendation algorithm 406 providing accurate recommendations to users associated with different virtual three-dimensional rooms 310 as these users interact with data elements and with other users within these different virtual three-dimensional rooms 310.

If the automated recommendation algorithm 406 generates one or more recommendations corresponding to the identified room configurations and/or data sources, the automated recommendation algorithm 406 may continue to automatically obtain and process new aggregated room interaction data from the real-time room interaction data aggregator 402 in real-time. As noted above, this continuous and real-time processing of aggregated room interaction data as this data is received may cause the automated recommendation algorithm 406 to continuously, and in real-time, evaluate user interactions within the various virtual three-dimensional rooms 310 to provide timely recommendations for new data sources and/or room configurations that may be implemented in these various three-dimensional rooms 310.

It should be noted that the process described above in connection with FIG. 5 may be performed in conjunction with one or more foundation models that may be dynamically trained, in real-time, to automatically generate one or more options for augmenting and/or enhancing an existing virtual three-dimensional room. As noted above, the automated recommendation algorithm 406 may automatically obtain and process aggregated data corresponding to real-time interactions within the virtual three-dimensional room to dynamically generate a natural language query that may be submitted to the one or more foundation models. The one or more foundation models may automatically process the query in real-time to identify any relevant keywords and/or anchors that may be used to generate different recommendations or options for augmenting and/or enhancing the existing virtual three-dimensional room, recommendations or options for generating new virtual three-dimensional rooms, and/or recommendations or options for merging the virtual three-dimensional room with another virtual three-dimensional room. In some instances, the one or more foundation models may be subscribed to the one or more topics on the message broker to automatically obtain, in real-time, interaction data associated with the virtual three-dimensional room. Through this interaction data, the one or more foundation models may automatically detect any events within the virtual three-dimensional room for which different augmentations and/or enhancements to the virtual three-dimensional room may be recommended or otherwise provided to users within the virtual three-dimensional room.

Figure 6A:
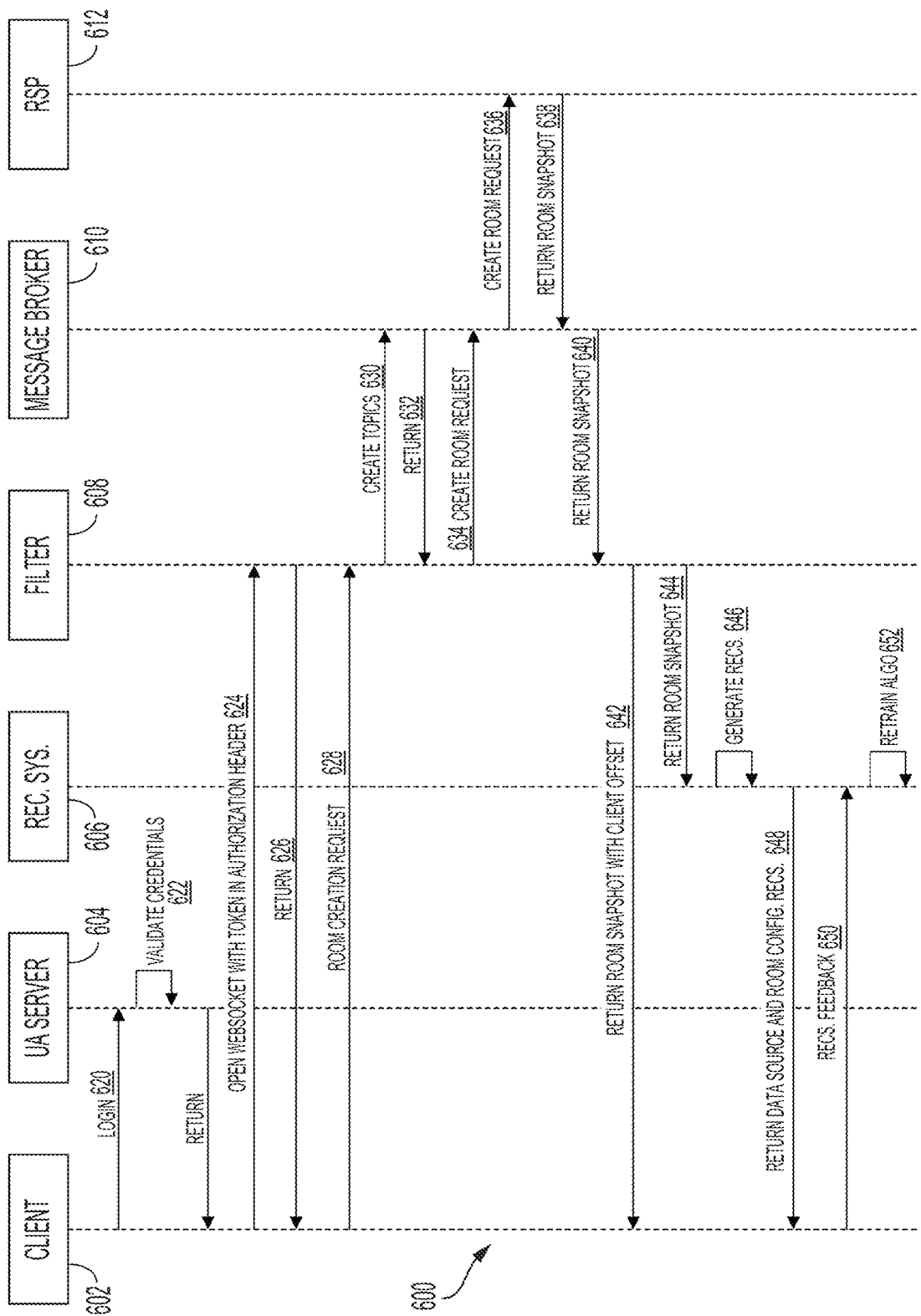
FIGS. 6A-6B show an illustrative example of a flow diagram for creating, updating, and providing recommendations for data sources and configurations corresponding to a virtual three-dimensional room within a virtual three-dimensional environment in accordance with at least one embodiment.
Figure 6B:
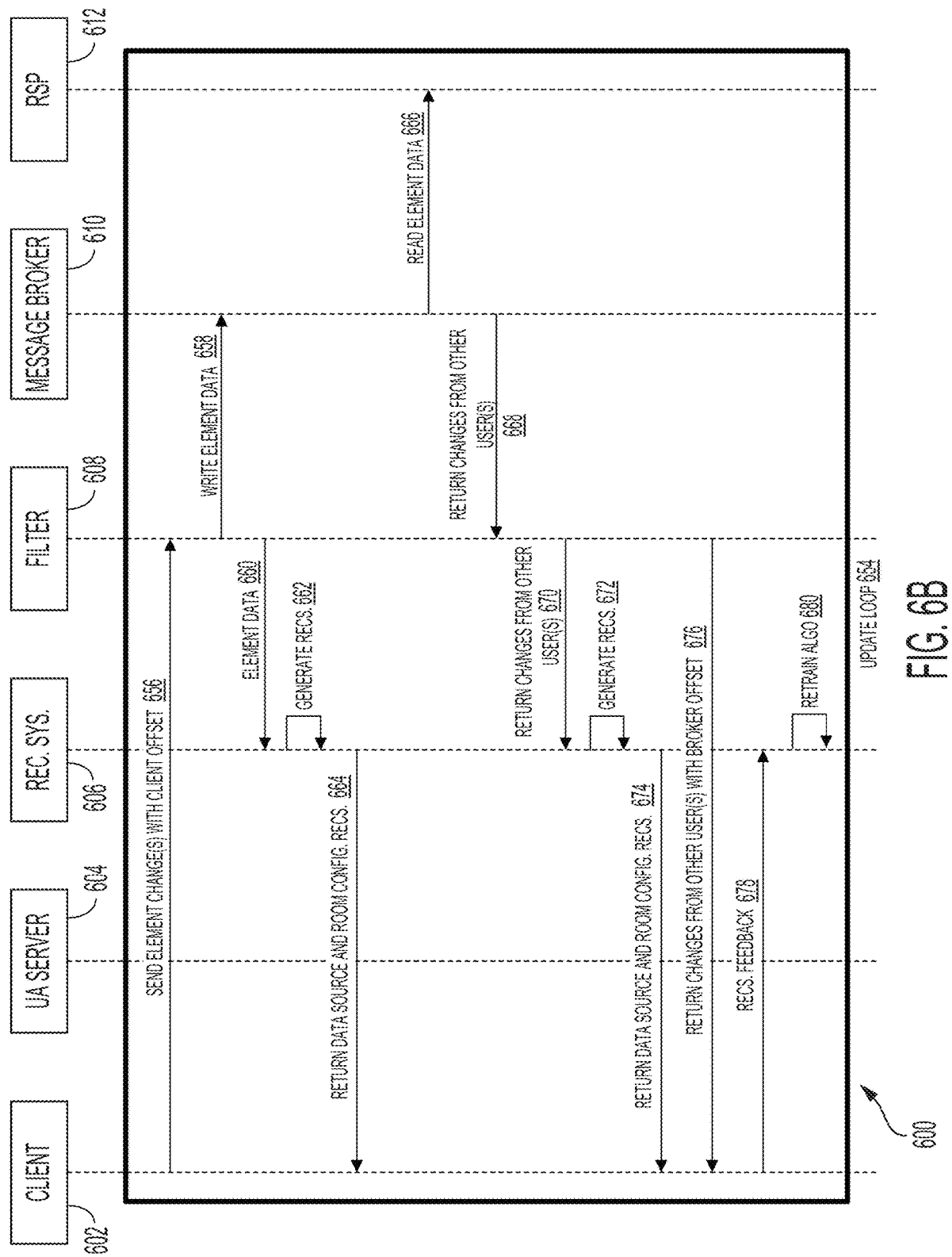

FIGS. 6A-6B show an illustrative example of a flow diagram 600 for creating, updating, and providing recommendations for data sources and configurations corresponding to a virtual three-dimensional room within a virtual three-dimensional environment in accordance with at least one embodiment. At step 620, a client 602 of the collaborative virtual environment service submits a request to login to a user account and authentication (UA) server 604. The login from the client 602 may be performed using an OAuth2 client credentials flow. For instance, the client may provide a unique client identifier and a client secret that may be verified by the UA server 604. The client 602 may also provide a set of credentials that may be verified by the UA server 604.

At step 622, the UA server 604 may process the login request and validate the client's credentials, including the provided client secret. If the UA server 604 determines that the provided credentials and client secret are valid, the UA server 604, at step 624, may respond with a JWT or other cryptographic token.

At step 624, the client 602 may open a websocket using the provided JWT or other cryptographic token in the authorization header of the websocket request to the filter server 608. The filter server 608 may use the public cryptographic key of the UA server 604 to validate the digital signature of the JWT or other cryptographic token provided in the websocket request to authenticate the client 602. If the client 602 is successfully authenticated by the filter server 608, the filter server 608, at step 626, may return a response to the client 602 indicating that the websocket connection has been established.

At step 628, the client 602 may submit a room creation request to the filter server 608. The room creation request may specify a name for the room, which the filter server 304 may evaluate to determine whether a room having this name exists. If the name for the room is available, the filter server 608, at step 630, creates new topics on the message broker 610 with a GUID appended to the name (e.g., "element-changes-up-{GUID}," "element-changes-down-{GUID}," etc.). At step 632, the message broker 610 may return a response indicating the successful creation of these new topics. In some instances, the room creation request may be provided in the form of a query that may be processed by one or more foundation models (as described herein) to automatically, and in real-time, provide different virtual three-dimensional room configuration options. For example, the collaborative virtual environment service may provide the client 602 with an interface (such as a GUI) through which the client 602 may submit a natural language query for creation of a new virtual three-dimensional room (e.g., "Generate a new operations center to address the security needs at Lumen Field," etc.). The one or more foundation models may automatically process this query to generate one or more virtual three-dimensional room configuration options that may be presented to the client 602 through their virtual three-dimensional environment, as described above.

Once the new topics have been created, the filter server 608, at step 634, may submit a create room request to the message broker 610. For instance, the filter server 608 may send a message on a "room-changes-up" topic to let the RSP 612 know that it should begin consuming and producing messages on the newly created topics. The RSP 612, at step 636, may obtain the create room request from the topic maintained by the message broker 610 and attaches its consumer and producer to the newly created topics. Further, at step 638, the RSP 612 may send a room snapshot to the "room-changes-down" topic maintained by the message broker 610. The message broker 610, at step 640, may return this room snapshot to the filter server 608. For instance, the filter server 608 may be subscribed to the "room-changes-down" topic and obtain a notification when a message is added to the topic. The filter server 608 may obtain the room snapshot from this topic and, at step 642, provide the client 602 with the room snapshot and a client offset.

In an embodiment, in addition to providing the client 602 with the room snapshot and the client offset, the filter server 608, at step 644, further provides the room snapshot to the room configuration recommendation system 606. At step 646, the room configuration recommendation system 606 may automatically, and in real-time, process the room snapshot obtained from the filter server 608 to generate one or more data source and/or room configuration recommendations that may be provided to the client 602 in response to their room creation request. As noted above, the room configuration recommendation system 606 may implement a machine learning algorithm or artificial intelligence (e.g., the automated recommendation algorithm 406 described above in connection with FIGS. 4 and 5, etc.) that is dynamically trained, in real-time, to generate recommendations for data elements and room configurations that may be implemented within any virtual three-dimensional room.

To generate the one or more data source and/or room configuration recommendations at step 646, the room configuration recommendation system 606, in some instances, may prompt the client 602 to provide additional information regarding the purpose of the virtual three-dimensional room. Any responses to these prompts, as well as the room snapshot, may be used as input to the aforementioned machine learning algorithm or artificial intelligence to generate the one or more data source and/or room configuration recommendations corresponding to different data elements and room configurations that may be implemented within the virtual three-dimensional room.

In an embodiment, if the room configuration recommendation system 606 implements or otherwise interacts with one or more foundation models for generating different virtual three-dimensional room options based on the client request, the one or more foundation models can automatically generate these one or more virtual three-dimensional room options based on the client room creation request submitted at step 628 without requiring the room snapshot obtained at step 644. As noted above, the one or more foundation models may automatically process a natural language request or query submitted by the client 602 at step 628 to dynamically, and in real-time, generate these one or more virtual three-dimensional room options. Accordingly, the room configuration recommendation system 606 may obtain these one or more virtual three-dimensional room options in parallel to the creation of the virtual three-dimensional environment for the client 602 at steps 634-640 as described above.

At step 648, the room configuration recommendation system 606 returns the newly generated data source and room configuration recommendations to the client 602. For instance, the room configuration recommendation system 606 may introduce one or more panels that may be used to present the data source and room configuration recommendations to the client 602 within the virtual three-dimensional room. As noted above, to introduce these one or more panels to the virtual three-dimensional room, the room configuration recommendation system 606 may transmit an element change to the filter server 608 that includes the generated recommendation and the configuration of the panel for presentation of the recommendation to the client 602. The filter server 608 may write this element change to the "element-changes-up-{GUID}" topic maintained by the message broker 610 and corresponding to the virtual three-dimensional room. The RSP 612 may read this element change data from the topic maintained by the message broker 610 and echoes the "element-changes-down-{GUID}" topic maintained by the message broker 610 for dissemination to the client 602. The filter server 608 obtains, from the "element-changes-down-{GUID}" topic maintained by the message broker 610, this element change and provides the element change to the client 602. This may cause the client 602 to implement the element change in order to present the recommendation to the user of the client 602 within the virtual three-dimensional room.

The client 602 may interact with the presented recommendation to determine whether to accept or reject the presented recommendation provided by the room configuration recommendation system 606. The client's acceptance or rejection of the provided recommendation may serve as feedback that may be used to retrain the aforementioned machine learning algorithm or artificial intelligence. Thus, at step 650, the client 602 may provide feedback corresponding to the presented recommendation to the room configuration recommendation system 606. The room configuration recommendation system 606, at step 652, may use this received feedback to retrain the machine learning algorithm or artificial intelligence. For instance, this feedback may be used to dynamically, and in real-time, re-train, reinforce, or otherwise update the machine learning algorithm or artificial intelligence to improve the likelihood of the machine learning algorithm or artificial intelligence providing accurate recommendations to clients associated with different virtual three-dimensional rooms as these users interact with data elements and with other users within these different virtual three-dimensional rooms.

As the client 602 performs actions within the virtual three-dimensional room, an update loop 654 (as illustrated in FIG. 6B) may be initiated. For instance, if the client 602 interacts with one or more elements within a virtual three-dimensional room, the client 602, at step 656, may send element changes with its client offset to the filter server 608. For instance, for each element change, the client 602 may send an auto-incrementing client offset, which is stored in the UserSession associated with the client 602 on the filter server 608. In response to receiving an element change from the client 602, the filter server 608, at step 658, writes the element change to the "element-changes-up-{GUID}" topic maintained by the message broker 610 and corresponding to the virtual three-dimensional room.

In an embodiment, in addition to writing the element change to the "element-changes-up-{GUID}" topic maintained by the message broker 610 and corresponding to the virtual three-dimensional room, the filter server 608, at step 660, provides the element data, in real-time, to the room configuration recommendation system 606. The room configuration recommendation system 606 may dynamically process this element change in real-time to identify any user behaviors and room utilization data for the virtual three-dimensional room. These user behaviors and room utilization data may be used by the room configuration recommendation system 606 to generate, at step 662, new recommendations corresponding to different data elements and room configurations that may be implemented within the virtual three-dimensional room. These new recommendations may be provided, at step 664, to the client 602 and any other users associated with the virtual three-dimensional room.

At step 666, the RSP 308 reads the element change data from the topic maintained by the message broker 610 and echoes to the "element-changes-down-{GUID}" topic maintained by the message broker 610 for dissemination to the other users in the virtual three-dimensional room. At step 668, the filter server 608 obtains, from the "element-changes-down-{GUID}" topic maintained by the message broker 610, any element changes implemented by other users of the virtual three-dimensional room. For each change, the filter server 608 may add an additional field of metadata (e.g., a broker offset), which is the offset in the topic that corresponds with the message. Clients may track this offset for reconnection purposes such that the client may be able to request messages beginning at the broker offset on reconnection based on the offset of the last message received.

At step 670, the filter server 608 may provide these element changes to the room configuration recommendation system 606. The room configuration recommendation system 606 may dynamically process these element changes in real-time to identify any user behaviors and room utilization data for the virtual three-dimensional room. These user behaviors and room utilization data may be used by the room configuration recommendation system 606 to generate, at step 672, new recommendations corresponding to different data elements and room configurations that may be implemented within the virtual three-dimensional room. These new recommendations may be provided, at step 674, to the client 602 and any other users associated with the virtual three-dimensional room through the aforementioned process described above.

At step 676, the filter server 608 may further provide these element changes with the broker offset to the client 602 to cause the client 602 to implement these element changes within the virtual three-dimensional room. As noted above, the room configuration recommendation system 606 may monitor, in real-time, user interactions with the one or more provided recommendations to obtain, in real-time, feedback corresponding to the provided recommendations at step 678. At step 680, the room configuration recommendation system 606 may use this feedback to dynamically, and in real-time, re-train, reinforce, or otherwise update the machine learning algorithm or artificial intelligence implemented by the room configuration recommendation system 606 to improve the likelihood of the machine learning algorithm or artificial intelligence providing accurate recommendations to users associated with the virtual three-dimensional room as these users interact with data elements and with other users within the virtual three-dimensional room.

Figure 7:
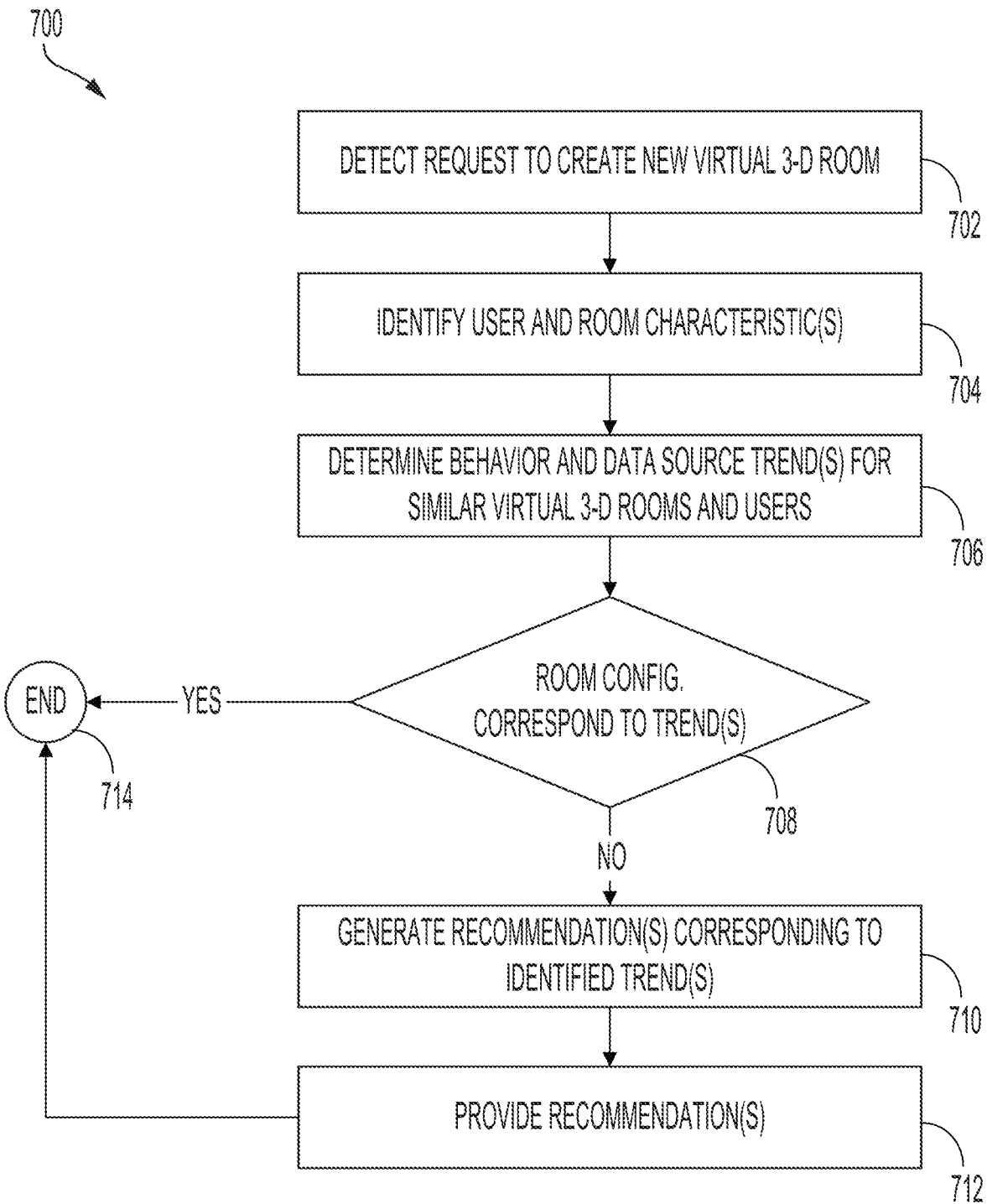
FIG. 7 shows an illustrative example of a process for generating recommendations corresponding to data sources and configurations for a new virtual three-dimensional room based on real-time trends associated with user behaviors and data sources within existing virtual three-dimensional rooms in accordance with at least one embodiment.

FIG. 7 shows an illustrative example of a process 700 for generating recommendations corresponding to data sources and configurations for a new virtual three-dimensional room based on real-time trends associated with user behaviors and data sources within existing virtual three-dimensional rooms in accordance with at least one embodiment. The process 700 may be performed by the aforementioned room configuration recommendation system implemented by the collaborative virtual environment service. As noted above, the room configuration recommendation system may dynamically train, in real-time, an automated recommendation algorithm that may be implemented to generate, in real-time, data source and room configuration recommendations that may be provided to users. Based on these recommendations, users may introduce any recommended data elements and/or modify the configuration of a virtual three-dimensional room as desired. User adherence to these recommendations may be used as feedback that may be processed to dynamically update the automated recommendation algorithm, as described herein. Thus, certain operations associated with the process 700 may be performed through the implementation of the automated recommendation algorithm.

At step 702, the room configuration recommendation system may detect a request to create a new virtual three-dimensional room. As noted above, when a user submits a request to create a new virtual three-dimensional room, the filter server implemented by the collaborative virtual environment service may obtain a room snapshot corresponding to the newly created virtual three-dimensional room. The filter server may provide this room snapshot, as well as identifying information associated with the user that submitted the request, to the room configuration recommendation system.

At step 704, the room configuration recommendation system may identify any available user and room characteristics that may be used to generate one or more recommendations to the user. For instance, the room configuration recommendation system may prompt the user to provide additional information regarding the purpose of the virtual three-dimensional room. For example, when the user submits their request to create a virtual three-dimensional room, the room configuration recommendation system may prompt the user to indicate what the purpose of the virtual three-dimensional room will be. Additionally, the room configuration recommendation system may evaluate the user account associated with the user to identify any roles assigned to the user and any other user characteristics that may be used to determine what data elements, data sources, and room configurations may be recommended to the user in response to their request. For instance, the user account may specify any known user demographics, the user's known geographic location, the user's current occupation, and the like.

At step 706, the room configuration recommendation system may further determine any user behavior and data source trends corresponding to similar virtual three-dimensional rooms and users. As noted above, the room configuration recommendation system may aggregate data corresponding to different users and virtual three-dimensional rooms implemented by the collaborative virtual environment service. This aggregated data may indicate user behaviors within different virtual three-dimensional rooms, as well as any room configurations of different virtual three-dimensional rooms, which may be implemented according to the types of users within the different virtual three-dimensional rooms. In an embodiment, the room configuration recommendation system can process this aggregated data through an automated recommendation algorithm to determine any user behavior and data source trends that may be used to generate recommendations for users associated with new and existing virtual three-dimensional rooms. The automated recommendation algorithm may process the aggregated data for each user and for each virtual three-dimensional room in order to determine myriad, real-time, user behavior and data source trends for each user and for each virtual three-dimensional room. This processing may be performed simultaneously for all users and virtual three-dimensional rooms in real-time as the aggregated data corresponding to these users and virtual three-dimensional rooms is obtained. Further, the automated recommendation algorithm may process these user behaviors and data source trends to identify any correlations amongst different users and virtual three-dimensional rooms in real-time, as described above.

Based on the identified user behavior and data source trends for similar virtual three-dimensional rooms and users, the room configuration recommendation system may determine, at step 708, whether the current room configuration for the newly created virtual three-dimensional room corresponds with the identified trends. For instance, if the room configuration recommendation system determines that similar users have introduced a particular map element into their respective virtual three-dimensional rooms and/or similar virtual three-dimensional rooms include this particular map element, the room configuration recommendation system may determine that this particular map element should be recommended to the user for implementation in the new virtual three-dimensional room. However, if the new virtual three-dimensional room already includes this identified map element, the room configuration recommendation system may determine that a recommendation corresponding to this map element is not necessary. As another illustrative example, if the room configuration recommendation system determines that similar users have introduced a particular panel element into their respective virtual three-dimensional rooms and/or similar virtual three-dimensional rooms include this particular panel element, but the new virtual three-dimensional room does not include this panel element, the room configuration recommendation system may determine that a recommendation corresponding to this panel element may be desirable to the user that submitted the request to generate the new virtual three-dimensional room, as this user and other similar users that may participate in this new virtual three-dimensional room may be likely to interact with this panel element.

If the room configuration recommendation system determines that the current room configuration of the new virtual three-dimensional room comports with the identified user behavior and data source trends identified through the automated recommendation algorithm, the room configuration recommendation system may determine that a recommendation corresponding to these identified trends is not required. Thus, at step 714, the process 700 may end for this particular virtual three-dimensional room. However, it should be noted that the room configuration recommendation system may continue to monitor user behaviors and data element interactions within this new virtual three-dimensional room, as well as user behaviors and interactions within other virtual three-dimensional rooms in real-time, to identify possible recommendations for other data elements and configurations that may be introduced to the new virtual three-dimensional room. This continuous process is described in greater detail herein, for example, in FIG. 8.

If the room configuration recommendation system determines that the current room configuration of the new virtual three-dimensional room does not comport with the identified user behavior and data source trends, the room configuration recommendation system, at step 710, may generate one or more recommendations corresponding to these identified trends. Returning to an earlier illustrative example, if the room configuration recommendation system determines that similar users have introduced a particular panel element into their respective virtual three-dimensional rooms and/or similar virtual three-dimensional rooms include this particular panel element, but the new virtual three-dimensional room does not include this panel element, the room configuration recommendation system may generate a recommendation corresponding to this panel element for presentation to the user.

At step 712, the room configuration recommendation system may provide the one or more recommendations generated based on the identified trends to the user. For instance, the room configuration recommendation system may introduce, within the new virtual three-dimensional room, one or more panels that may be used to present the data source and room configuration recommendations to the user within the virtual three-dimensional room. As noted above, to introduce these one or more panels to the new virtual three-dimensional room, the room configuration recommendation system may transmit an element change to the filter server that includes the generated recommendation and the configuration of the one or more panels for presentation of the recommendation to the user. The filter server may write this element change to the "element-changes-up-{GUID}" topic maintained by the message broker and corresponding to the virtual three-dimensional room. The RSP may read this element change data from the topic maintained by the message broker and echo the "element-changes-down-{GUID}" topic maintained by the message broker for dissemination to the user, as described above. Thus, when the user receives this element change, the user may implement the element change in order to present the recommendation within the virtual three-dimensional room.

Figure 8:
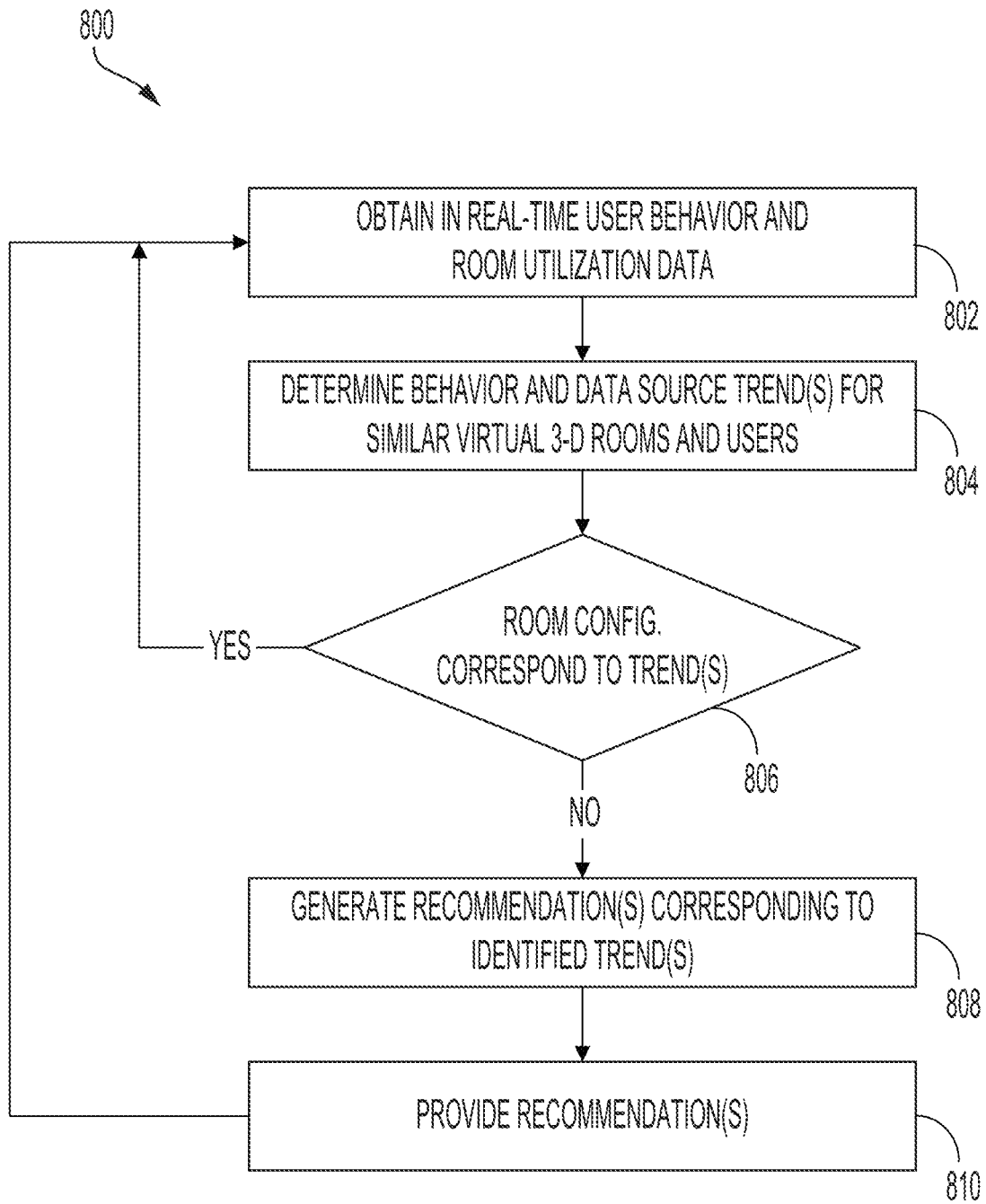
FIG. 8 shows an illustrative example of a process for generating recommendations corresponding to data sources and configurations for an existing virtual three-dimensional room based on real-time trends associated with user behaviors and data sources within other existing virtual three-dimensional rooms in accordance with at least one embodiment.

FIG. 8 shows an illustrative example of a process 800 for generating recommendations corresponding to data sources and configurations for an existing virtual three-dimensional room based on real-time trends associated with user behaviors and data sources within other existing virtual three-dimensional rooms in accordance with at least one embodiment. The process 800 may be performed by the aforementioned room configuration recommendation system implemented by the collaborative virtual environment service. Similar to the process 700 described above in connection with FIG. 7, certain operations associated with the process 800 may be performed through the implementation of the automated recommendation algorithm by the room configuration recommendation system. It should be noted that the process 800 may be performed in real-time across the myriad virtual three-dimensional rooms implemented by the collaborative virtual environment service.

At step 802, the room configuration recommendation system may obtain, in real-time, user behavior and room utilization data corresponding to an active virtual three-dimensional room. For instance, the room configuration recommendation system may monitor, in real-time, any messages exchanged by the filter server corresponding to element changes being propagated to different data elements within the active virtual three-dimensional room. Further, the room configuration recommendation system may monitor, in real-time, any echoed messages from the RSP that are to be propagated to other users within the virtual three-dimensional room as a result of detected changes to data elements within the virtual three-dimensional room. In an embodiment, the room configuration recommendation system evaluates these messages in real-time through the automated recommendation algorithm to determine any user behavior and room utilization trends corresponding to the virtual three-dimensional room.

At step 804, the room configuration recommendation system may determine user behavior and data source trends corresponding to similar virtual three-dimensional rooms and users. Similar to step 706 associated with the process 700 described above in connection with FIG. 7, the room configuration recommendation system may aggregate data corresponding to different users and virtual three-dimensional rooms implemented by the collaborative virtual environment service. The room configuration recommendation system can process this aggregated data through the automated recommendation algorithm to determine any user behavior and data source trends that may be used to generate recommendations for users associated with new and existing virtual three-dimensional rooms. The automated recommendation algorithm may process the aggregated data for each user and for each virtual three-dimensional room in order to determine myriad, real-time, user behavior and data source trends for each user and for each virtual three-dimensional room. This processing may be performed simultaneously for all users and virtual three-dimensional rooms in real-time as the aggregated data corresponding to these users and virtual three-dimensional rooms is obtained. Further, the automated recommendation algorithm may process these user behaviors and data source trends to identify any correlations amongst different users and virtual three-dimensional rooms in real-time, as described above.

At step 806, the room configuration recommendation system may determine whether the user behaviors and room utilization data corresponding to the virtual three-dimensional room comport with the identified trends associated with the similar virtual three-dimensional rooms and users. For instance, if the room configuration recommendation system determines that similar users have introduced a particular data element into their respective virtual three-dimensional rooms and/or similar virtual three-dimensional rooms include this particular data element, the room configuration recommendation system may determine that this particular data element should be recommended to the user(s) associated with the virtual three-dimensional room for implementation in the existing virtual three-dimensional room. However, if the virtual three-dimensional room already includes this identified data element, the room configuration recommendation system may determine that a recommendation corresponding to this data element is not necessary. Alternatively, if the virtual three-dimensional room does not include this identified data element, the room configuration recommendation system may determine that this particular data element may be recommended to the user(s) associated with the virtual three-dimensional room.

If the room configuration recommendation system determines that the configuration of the virtual three-dimensional room comports with the identified trends corresponding to similar virtual three-dimensional rooms and users, the room configuration recommendation system may continue to monitor the virtual three-dimensional room in real-time to obtain new user behavior and room utilization data, thereby restarting the process 800. This continuous and real-time processing of aggregated room interaction data as this data is received may cause the room configuration recommendation system to continuously, and in real-time, evaluate user interactions within the various virtual three-dimensional rooms, including the target virtual three-dimensional room, to provide timely recommendations for new data sources and/or room configurations that may be implemented in these various three-dimensional rooms. Thus, if the room configuration recommendation system determines that no new recommendations need to be presented to users associated with the particular virtual three-dimensional room, the room configuration recommendation system may continue, in real-time, to evaluate new aggregated interaction data as it is received in order to provide recommendations for new data sources and/or room configurations for this particular virtual three-dimensional room as needed.

If the room configuration recommendation system determines that the current room configuration of the particular virtual three-dimensional room does not comport with the identified user behavior and data source trends, the room configuration recommendation system, at step 808, may generate one or more recommendations corresponding to these identified trends. Further, the room configuration recommendation system, at step 810, may provide these one or more recommendations to one or more users associated with the particular virtual three-dimensional room. As noted above, for an existing virtual three-dimensional room including myriad users interacting with various data elements within the existing virtual three-dimensional room, the room configuration recommendation system may generate a recommendation that may be provided to these myriad users within the virtual three-dimensional room. A recommendation for a particular data element and/or room configuration provided to these multiple users within the particular virtual three-dimensional room can be subject to one or more acceptance criteria such that, if these one or more acceptance criteria are not satisfied, the recommendation is deemed to be rejected by the multiple users. Once the room configuration recommendation system provides this recommendation to one or more users associated with the particular virtual three-dimensional room, the room configuration recommendation system may continue to obtain, in real-time, new user behavior and room utilization data associated with the particular virtual three-dimensional room, which can be used to dynamically generate new recommendations in real-time as needed.

Figure 9:
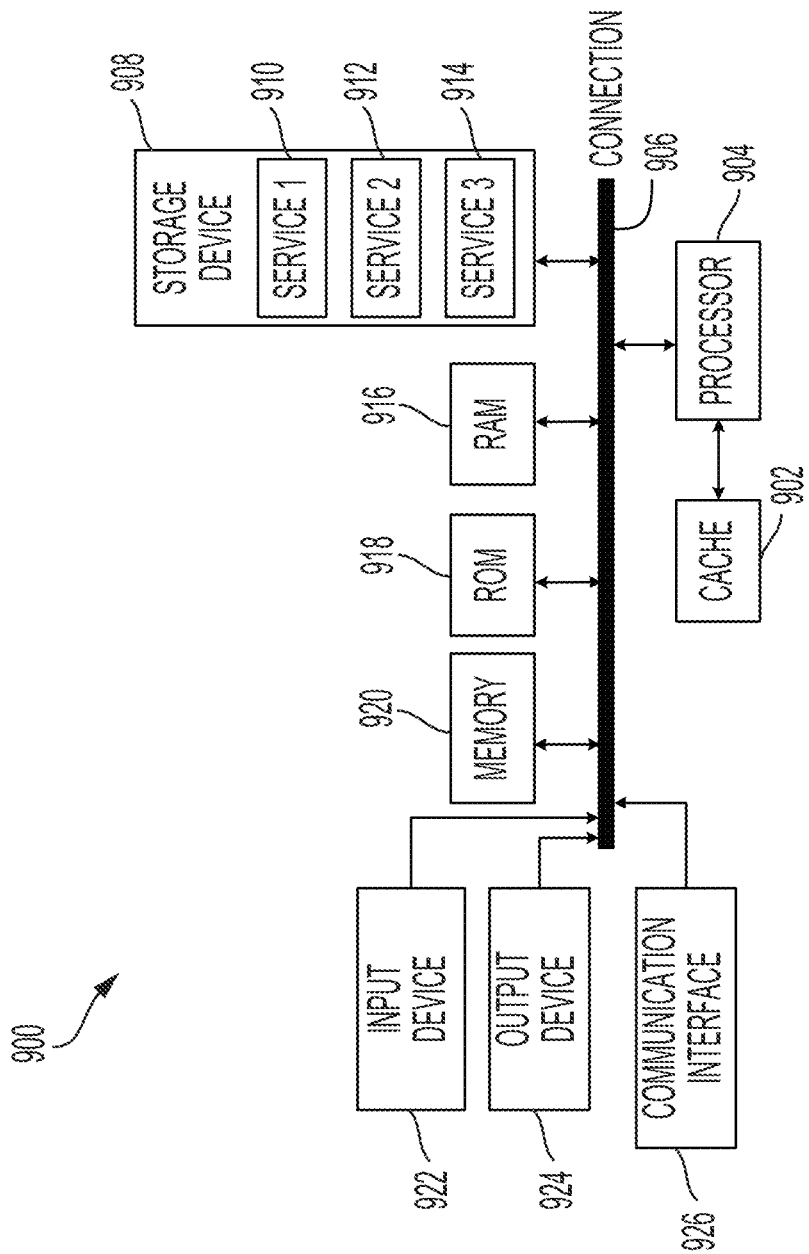
FIG. 9 shows an illustrative example of an environment in which various embodiments can be implemented.

FIG. 9 illustrates a computing system architecture 900 including various components in electrical communication with each other using a connection 906, such as a bus, in accordance with some implementations. Example system architecture 900 includes a processing unit (CPU or processor) 904 and a system connection 906 that couples various system components including the system memory 920, such as ROM 918 and RAM 916, to the processor 904. The system architecture 900 can include a cache 902 of high-speed memory connected directly with, in close proximity to, or integrated as part of the processor 904. The system architecture 900 can copy data from the memory 920 and/or the storage device 908 to the cache 902 for quick access by the processor 904. In this way, the cache can provide a performance boost that avoids processor 904 delays while waiting for data. These and other modules can control or be configured to control the processor 904 to perform various actions.

Other system memory 920 may be available for use as well. The memory 920 can include multiple different types of memory with different performance characteristics. The processor 904 can include any general purpose processor and a hardware or software service, such as service 1 910, service 2 912, and service 3 914 stored in storage device 908, configured to control the processor 904 as well as a special-purpose processor where software instructions are incorporated into the actual processor design. The processor 904 may be a completely self-contained computing system, containing multiple cores or processors, a bus, memory controller, cache, etc. A multi-core processor may be symmetric or asymmetric.

To enable user interaction with the computing system architecture 900, an input device 922 can represent any number of input mechanisms, such as a microphone for speech, a touch-sensitive screen for gesture or graphical input, keyboard, mouse, motion input, speech and so forth. An output device 924 can also be one or more of a number of output mechanisms known to those of skill in the art. In some instances, multimodal systems can enable a user to provide multiple types of input to communicate with the computing system architecture 900. The communications interface 926 can generally govern and manage the user input and system output. There is no restriction on operating on any particular hardware arrangement and therefore the basic features here may easily be substituted for improved hardware or firmware arrangements as they are developed.

Storage device 908 is a non-volatile memory and can be a hard disk or other types of computer readable media which can store data that are accessible by a computer, such as magnetic cassettes, flash memory cards, solid state memory devices, digital versatile disks, cartridges, RAMs 916, ROM 918, and hybrids thereof.

The storage device 908 can include services 910, 912, 914 for controlling the processor 904. Other hardware or software modules are contemplated. The storage device 908 can be connected to the system connection 906. In one aspect, a hardware module that performs a particular function can include the software component stored in a computer-readable medium in connection with the necessary hardware components, such as the processor 904, connection 906, output device 924, and so forth, to carry out the function.

The disclosed methods can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, WA, and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method comprising:
   obtaining element changes corresponding to a set of data elements, wherein the element changes correspond to interactions performed by a set of users within a virtual three-dimensional room, and wherein the virtual three-dimensional room is implemented using a real time stream processor (RSP);
   dynamically training a machine learning algorithm to generate recommendations corresponding to different data elements for different virtual three-dimensional rooms, wherein the machine learning algorithm is dynamically trained using user behavior and room utilization data corresponding to other users and to other virtual three-dimensional rooms;
   processing the element changes in real-time while the element changes are occurring, wherein the element changes are processed using the machine learning algorithm to generate a set of recommendations, and wherein the set of recommendations correspond to new data elements for the virtual three-dimensional room;

providing the set of recommendations;
receiving one or more responses to the set of recommendations, wherein the one or more responses indicate acceptance of the new data elements;
providing element data corresponding to the new data elements, wherein when the element data is received, the element data causes devices corresponding to the set of users to display the new data elements within the virtual three-dimensional room; and
dynamically updating the machine learning algorithm using the set of recommendations and the one or more responses.

2. The computer-implemented method of claim 1, wherein the set of users access the virtual three-dimensional room using different types of systems, and wherein the different types of systems include virtual reality systems, augmented reality systems, and desktop systems.

3. The computer-implemented method of claim 1, wherein the one or more responses indicate the acceptance of the new data elements as a result of the one or more responses corresponding to a quorum of the set of users having accepted the set of recommendations.

4. The computer-implemented method of claim 1, wherein providing the set of recommendations includes:
propagating in real-time the set of recommendations to the devices corresponding to the set of users, wherein when the set of recommendations are propagated to the devices, the set of recommendations is displayed in real-time through the virtual three-dimensional room.

5. The computer-implemented method of claim 1, wherein the virtual three-dimensional room is implemented using a hierarchical component-based model-view-viewmodel (MVVM) decentralized application.

6. The computer-implemented method of claim 1, wherein the user behavior and room utilization data include user data corresponding to roles associated with the other users.

7. The computer-implemented method of claim 1, wherein the element data corresponding to the new data elements is provided according to a set of permissions associated with the new data elements and the set of users.

8. A system, comprising:
one or more processors; and
memory storing thereon instructions that, as a result of being executed by the one or more processors, cause the system to:
obtain element changes corresponding to a set of data elements, wherein the element changes correspond to interactions performed by a set of users within a virtual three-dimensional room, and wherein the virtual three-dimensional room is implemented using a real time stream processor (RSP);
dynamically train a machine learning algorithm to generate recommendations corresponding to different data elements for different virtual three-dimensional rooms, wherein the machine learning algorithm is dynamically trained using user behavior and room utilization data corresponding to other users and to other virtual three-dimensional rooms;
process the element changes in real-time while the element changes are occurring, wherein the element changes are processed using the machine learning algorithm to generate a set of recommendations, and wherein the set of recommendations correspond to new data elements for the virtual three-dimensional room;
provide the set of recommendations;
receive one or more responses to the set of recommendations, wherein the one or more responses indicate acceptance of the new data elements;
provide element data corresponding to the new data elements, wherein when the element data is received, the element data causes devices corresponding to the set of users to display the new data elements within the virtual three-dimensional room; and
dynamically update the machine learning algorithm using the set of recommendations and the one or more responses.

9. The system of claim 8, wherein the set of users access the virtual three-dimensional room using different types of systems, and wherein the different types of systems include virtual reality systems, augmented reality systems, and desktop systems.

10. The system of claim 8, wherein the one or more responses indicate the acceptance of the new data elements as a result of the one or more responses corresponding to a quorum of the set of users having accepted the set of recommendations.

11. The system of claim 8, wherein the instructions that cause the system to provide the set of recommendations further cause the system to:
propagate in real-time the set of recommendations to the devices corresponding to the set of users, wherein when the set of recommendations are propagated to the devices, the set of recommendations is displayed in real-time through the virtual three-dimensional room.

12. The system of claim 8, wherein the virtual three-dimensional room is implemented using a hierarchical component-based model-view-viewmodel (MVVM) decentralized application.

13. The system of claim 8, wherein the user behavior and room utilization data include user data corresponding to roles associated with the other users.

14. The system of claim 8, wherein the element data corresponding to the new data elements is provided according to a set of permissions associated with the new data elements and the set of users.

15. A non-transitory, computer-readable storage medium, storing thereon executable instructions that, as a result of being executed by one or more processors of a computer system, cause the computer system to:
obtain element changes corresponding to a set of data elements, wherein the element changes correspond to interactions performed by a set of users within a virtual three-dimensional room, and wherein the virtual three-dimensional room is implemented using a real time stream processor (RSP);
dynamically train a machine learning algorithm to generate recommendations corresponding to different data elements for different virtual three-dimensional rooms, wherein the machine learning algorithm is dynamically trained using user behavior and room utilization data corresponding to other users and to other virtual three-dimensional rooms;
process the element changes in real-time while the element changes are occurring, wherein the element changes are processed using the machine learning algorithm to generate a set of recommendations, and wherein the set of recommendations correspond to new data elements for the virtual three-dimensional room;
provide the set of recommendations;
receive one or more responses to the set of recommendations, wherein the one or more responses indicate acceptance of the new data elements;

provide element data corresponding to the new data elements, wherein when the element data is received, the element data causes devices corresponding to the set of users to display the new data elements within the virtual three-dimensional room; and dynamically update the machine learning algorithm using the set of recommendations and the one or more responses.

16. The non-transitory, computer-readable storage medium of claim 15, wherein the set of users access the virtual three-dimensional room using different types of systems, and wherein the different types of systems include virtual reality systems, augmented reality systems, and desktop systems.

17. The non-transitory, computer-readable storage medium of claim 15, wherein the one or more responses indicate the acceptance of the new data elements as a result of the one or more responses corresponding to a quorum of the set of users having accepted the set of recommendations.

18. The non-transitory, computer-readable storage medium of claim 15, wherein the executable instructions that cause the computer system to provide the set of recommendations further cause the computer system to:

propagate in real-time the set of recommendations to the devices corresponding to the set of users, wherein when the set of recommendations are propagated to the devices, the set of recommendations is displayed in real-time through the virtual three-dimensional room.

19. The non-transitory, computer-readable storage medium of claim 15, wherein the virtual three-dimensional room is implemented using a hierarchical component-based model-view-viewmodel (MVVM) decentralized application.

20. The non-transitory, computer-readable storage medium of claim 15, wherein the user behavior and room utilization data include user data corresponding to roles associated with the other users.

21. The non-transitory, computer-readable storage medium of claim 15, wherein the element data corresponding to the new data elements is provided according to a set of permissions associated with the new data elements and the set of users.

* * * * *